United States Patent
Huang

(10) Patent No.: US 11,943,304 B2
(45) Date of Patent: Mar. 26, 2024

(54) INFORMATION PROCESSING METHOD, COMMUNICATION APPARATUS, AND COMMUNICATION SYSTEM

(71) Applicant: HUAWEI TECHNOLOGIES CO., LTD., Shenzhen (CN)

(72) Inventor: Zhenglei Huang, Beijing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 17/809,757

(22) Filed: Jun. 29, 2022

(65) Prior Publication Data
US 2022/0353337 A1  Nov. 3, 2022

Related U.S. Application Data

(63) Continuation of application No. PCT/CN2019/130431, filed on Dec. 31, 2019.

(51) Int. Cl.
*H04L 67/141* (2022.01)
*H04W 48/16* (2009.01)
*H04W 76/10* (2018.01)

(52) U.S. Cl.
CPC ........ *H04L 67/141* (2013.01); *H04W 48/16* (2013.01); *H04W 76/10* (2018.02)

(58) Field of Classification Search
CPC ...... H04L 67/141; H04W 76/10; H04W 48/16
(Continued)

(56) References Cited

U.S. PATENT DOCUMENTS

2015/0085845 A1* 3/2015 Wang .............. H04W 76/14
370/338
2019/0191330 A1* 6/2019 Dao ................. H04L 69/22
(Continued)

FOREIGN PATENT DOCUMENTS

CN  109792788 A  5/2019
CN  110418328 A  11/2019
(Continued)

OTHER PUBLICATIONS

ETSI, "Procedures for the 5G System (5GS) (3GPP TS 23.502 version 15.4.1 Release 15)", Mar. 2019, ETSI, https://www.etsi.org/deliver/etsi_ts/123500_123599/123502/15.04.01_60/ts_123502v150401p.pdf (Year: 2019).*
(Continued)

*Primary Examiner* — Ruolei Zong
(74) *Attorney, Agent, or Firm* — HAUPTMAN HAM, LLP

(57) ABSTRACT

An information processing method, a communication apparatus, and a communication system are provided. A core network control plane network element receives a tunnel establishment request from an application function entity, where the tunnel establishment request is used to request to establish a shared tunnel for transmitting data by a terminal device; the core network control plane network element determines a tunnel configuration policy corresponding to the tunnel establishment request; the core network control plane network element selects a session management network element based on the tunnel establishment request; and the core network control plane network element sends the tunnel configuration policy to the session management network element, where the tunnel configuration policy is used to indicate the session management network element to
(Continued)

trigger establishment of the shared tunnel between an access network node and a user plane function network element.

15 Claims, 10 Drawing Sheets

(58) Field of Classification Search
USPC .......................................................... 709/222
See application file for complete search history.

(56) References Cited

U.S. PATENT DOCUMENTS

| | | | |
|---|---|---|---|
| 2019/0191467 A1 | 6/2019 | Dao et al. | |
| 2019/0238345 A1 | 8/2019 | Gage | |
| 2019/0261260 A1* | 8/2019 | Dao | H04W 36/0033 |
| 2019/0306913 A1* | 10/2019 | Kim | H04W 4/70 |
| 2020/0267623 A1* | 8/2020 | Altay | H04L 45/64 |
| 2021/0127271 A1* | 4/2021 | Wu | H04W 12/0471 |
| 2022/0060901 A1* | 2/2022 | Rajendran | H04W 36/0088 |

FOREIGN PATENT DOCUMENTS

| | | | |
|---|---|---|---|
| CN | 110519775 A | 11/2019 | |
| CN | 110519805 A | 11/2019 | |
| WO | 2019219752 A1 | 11/2019 | |
| WO | WO-2020253747 A1 * | 12/2020 | H04W 76/10 |

OTHER PUBLICATIONS

3GPP TS 22.261 V17.1.0 (Dec. 2019), 3rd Generation Partnership Project; Technical Specification Group Services and System Aspects; Service requirements for the 5G system; Stage 1(Release 17), 83 pages.
3GPP TS 23.501 V16.3.0 (Dec. 2019), 3rd Generation Partnership Project; Technical Specification Group Services and System Aspects; System architecture for the 5G System (5GS); Stage 2(Release 16), 417 pages.
International Search Report issued in corresponding International Application No. PCT/CN2019/130431, dated Aug. 28, 2020, pp. 1-12.
Nokia, Nokia Shanghai Bell, TR 23.724 Impact area of UP (CL) solution. 3GPP TSG SA WG2 #127bis, Newport Beach, USA, May 28-Jun. 1, 2018, S2-186897, 14 pages.
Huawei, HiSilicon, Packet Aggregation for Small Data Delivery. SA WG2 Meeting #127, Apr. 16-20, 2018, Sanya, China, S2-183729, 10 pages.
3GPP TS 29.502 V16.2.0 (Dec. 2019), 3rd Generation Partnership Project; Technical Specification Group Core Network and Terminals; 5G System; Session Management Services; Stage 3(Release 16), 211 pages.
3GPP TR 23.724 V16.1.0 (Jun. 2019), 3rd Generation Partnership Project; Technical Specification Group Services and System Aspects; Study on Cellular Internet of Things (CIoT) support and evolution for the 5G System (5GS)(Release 16), 274 pages.
Partial Supplementary European Search Report issued in corresponding European Application No. 19958520.9, dated Dec. 5, 2022, pp. 1-23.

* cited by examiner

INFORMATION PROCESSING METHOD, COMMUNICATION APPARATUS, AND COMMUNICATION SYSTEM

CROSS-REFERENCE TO RELATED APPLICATIONS

This application is a continuation of International Patent Application No. PCT/CN2019/130431, filed on Dec. 31, 2019, the disclosure of which is hereby incorporated by reference in its entirety.

BACKGROUND

Massive machine-type communications (massive machine-type communications, mMTC) is one of application scenarios of a 5th generation mobile communication network (5th generation mobile communication network, 5G), and is mainly oriented to various internet of things (internet of things, IoT) service applications that are based on a cellular network. The mMTC is mainly characterized by a connection requirement of large-scale massive internet of things terminals, which may reach one million connections per square kilometer. This causes a great challenge to a network architecture and a protocol design. In addition, the mMTC is characterized by a low data volume, low power consumption, deep coverage, low complexity, and the like.

In an IoT application scenario, a volume of data that needs to be transmitted by a terminal is usually very small. For example, a data packet such as an electricity meter reading data packet usually includes dozens of bytes. In the 5G network, a data transmission procedure for a common data service relates to signaling exchange such as protocol data unit (protocol data unit, PDU) session management and user plane bearer establishment, and a data transmission tunnel is established for data transmission. In response to the data transmission procedure in the 5G network being applied to the IoT application scenario, signaling overheads caused by transmitting a small data packet are far greater than the volume of the data that needs to be transmitted, and transmission efficiency is low.

For connections of massive terminals in the IoT application scenario, a data transmission tunnel is established between a radio access network (radio access network, RAN) and a user plane function (user plane function, UPF) entity. In a process of establishing the data transmission tunnel, a session management function (session management function, SMF) entity in the 5G network may establish the data transmission tunnel based on the following two types of information: shared tunnel policy information sent by a policy control function (policy control function, PCF) entity, and logical network configuration information sent by a network management function entity (for example, a network management system). Both the shared tunnel policy information sent by the PCF entity and the logical network configuration information sent by the network management function entity are statically preconfigured information. Consequently, the established data transmission tunnel is not applicable to terminals of different IoT service types.

SUMMARY

At least one embodiment provides an information processing method, a communication apparatus, and a communication system, to establish a shared tunnel between an access network node and a user plane function network element, so that a terminal device transmits data based on the shared tunnel.

To resolve the foregoing technical problem, at least one embodiment provides the following technical solutions.

At least one embodiment provides an information processing method. The method includes: A core network control plane network element receives a tunnel establishment request from an application function entity, where the tunnel establishment request is used to request to establish a shared tunnel for transmitting data by a terminal device; the core network control plane network element determines a tunnel configuration policy corresponding to the tunnel establishment request; the core network control plane network element selects a session management network element based on the tunnel establishment request; and the core network control plane network element sends the tunnel configuration policy to the session management network element, where the tunnel configuration policy is used to indicate the session management network element to trigger establishment of the shared tunnel between an access network node and a user plane function network element. In this solution, the core network control plane network element receives the tunnel establishment request from the application function entity, and the core network control plane network element sends the tunnel configuration policy to the session management network element, so that the session management network element determines the user plane function network element and the access network node. The user plane function network element and the access network node establishes the shared tunnel used by the terminal device to transmit data. In at least one embodiment, the shared tunnel requested by the application function entity to be established is used for transmitting data by the terminal device, so that the shared tunnel is dynamically established between the access network node and the user plane function network element based on a use of the terminal device on the data transmission, and the shared tunnel that is dynamically established to implement the data transmission of the terminal device.

In at least one embodiment, that a core network control plane network element receives a tunnel establishment request from an application function entity includes: The core network control plane network element receives the tunnel establishment request from a network exposure network element, where the network exposure network element receives the tunnel establishment request from the application function entity. In this solution, the network exposure network element provides a network exposure interface, and the application function entity sends the tunnel establishment request to the core network control plane network element by using the network exposure network element, so that the core network control plane network element obtains the tunnel establishment request. This implements information exchange between the application function entity and the core network control plane network element.

In at least one embodiment, the core network control plane network element determines a tunnel configuration policy corresponding to the tunnel establishment request includes: The core network control plane network element obtains a group configuration policy corresponding to the terminal device; and the core network control plane network element generates the tunnel configuration policy based on the tunnel establishment request and the group configuration policy. In this solution, the group configuration policy corresponding to the terminal device is a group (group) policy of an operator. The core network control plane network element obtains, from the tunnel establishment request, a configuration (for example, QoS information and/or network area information) of the terminal device and that is on the shared tunnel. The core network control plane network element determines, based on shared tunnel configuration information provided by the application function entity and the group policy of the operator, the tunnel configuration policy corresponding to the tunnel establishment request. For example, the tunnel configuration policy includes user group information, an identifier of the shared tunnel, the QoS information, and the network area information.

In at least one embodiment, the tunnel establishment request includes at least one of the following: first group information corresponding to the terminal device, service information corresponding to the shared tunnel, quality of service information corresponding to the shared tunnel, and network area information corresponding to the shared tunnel. In this solution, the first group information is used to identify a user group corresponding to the shared tunnel, and is specifically a user group identifier. The service information is used to describe a service corresponding to the shared tunnel, and is information such as an IP address and a port number of the service. The QoS information is used to describe a QoS configuration of a service application and that is on the shared tunnel, and is, for example, a data transmission rate (namely, a bandwidth) and an end-to-end delay provided by the shared tunnel. The network area information is used by the core network control plane network element to determine a range for establishing the shared tunnel, and is geographical area information. Information content carried by the tunnel establishment request is determined based on a specific scenario. This is not limited herein.

In at least one embodiment, the tunnel configuration policy includes at least one of the following: second group information corresponding to the terminal device, an identifier of the shared tunnel, the quality of service information corresponding to the shared tunnel, and the network area information corresponding to the shared tunnel. In this solution, after obtaining the tunnel establishment request, the core network control plane network element generates and determine the tunnel configuration policy corresponding to the tunnel establishment request. The tunnel configuration policy is also referred to as a shared tunnel configuration policy, and includes policy information for establishing the shared tunnel. For example, the tunnel configuration policy includes at least one of the following: the second user group information of the terminal device, the identifier of the shared tunnel, the QoS information, and the network area information.

At least one embodiment further provides an information processing method. The method includes: A session management network element receives a tunnel configuration policy from a core network control plane network element; the session management network element selects a user plane function network element based on the tunnel configuration policy and user plane function network element capability information, and the session management network element sends first shared tunnel establishment information to the user plane function network element; and the session management network element determines an access network node according to the tunnel configuration policy, and the session management network element sends second shared tunnel establishment information to the access network node, where the first shared tunnel establishment information and the second shared tunnel establishment information are used to establish a shared tunnel between the access network node and the user plane function network element. In this solution, the core network control plane network element sends the tunnel configuration policy to the session management network element, so that the session management network element determines the user plane function network element and the access network node. The user plane function network element and the access network node is the shared tunnel used by a terminal device to transmit data. In at least one embodiment, the shared tunnel requested by an application function entity to be established is used for transmitting data by the terminal device, so that the shared tunnel is dynamically established between the access network node and the user plane function network element based on a service configuration of the terminal device on the data transmission, and the shared tunnel that is dynamically established to implement the data transmission of the terminal device.

In at least one embodiment, the first shared tunnel establishment information includes at least one of the following: an identifier of the shared tunnel and quality of service information corresponding to the shared tunnel. In this solution, the identifier of the shared tunnel and the quality of service information corresponding to the shared tunnel is used by the user plane function network element to establish the shared tunnel, so that the user plane function network element establishes the shared tunnel.

In at least one embodiment, the second shared tunnel establishment information includes at least one of the following: the identifier of the shared tunnel, the quality of service information corresponding to the shared tunnel, and an address of the user plane function network element. In this solution, the access network node determines, based on the address of the user plane function network element, that the shared tunnel is established with the user plane function network element. The identifier of the shared tunnel and the quality of service information corresponding to the shared tunnel is used by the access network node to establish the shared tunnel, so that the access network node establishes the shared tunnel.

In at least one embodiment, after the session management network element sends the second shared tunnel establishment information to the access network node, the method further includes: The session management network element receives a tunnel establishment response from the access network node, where the tunnel establishment response includes an address of the access network node corresponding to the shared tunnel. In this solution, after establishing the shared tunnel between the user plane function network element and the access network node, the access network node sends the tunnel establishment response to the session management network element. The tunnel establishment response includes the address of the access network node corresponding to the shared tunnel. The session management network element receives the tunnel establishment response from the access network node. The session management network element parses the tunnel establishment response, to obtain the address of the access network node corresponding to the shared tunnel. The session management network element then sends session configuration information to the user plane function network element. The session configuration information includes at least one of the following: the identifier of the shared tunnel and the address of the access network node corresponding to the shared tunnel. Therefore, the user plane function network element obtains, based on the received session configuration information, the address of the access network node corresponding to the shared tunnel, so that the user plane function network element communicates with the access network node.

In at least one embodiment, after the session management network element receives the tunnel establishment response from the access network node, the method further includes: The session management network element sends the session configuration information to the user plane function network element, where the session configuration information includes at least one of the following: the identifier of the shared tunnel and the address of the access network node corresponding to the shared tunnel. In this solution, after establishing the shared tunnel between the user plane function network element and the access network node, the access network node sends the tunnel establishment response to the session management network element. The tunnel establishment response includes the address of the access network node corresponding to the shared tunnel. The session management network element receives the tunnel establishment response from the access network node. The session management network element parses the tunnel establishment response, to obtain the address of the access network node corresponding to the shared tunnel. The session management network element then sends the session configuration information to the user plane function network element. The session configuration information includes at least one of the following: the identifier of the shared tunnel and the address of the access network node corresponding to the shared tunnel. Therefore, the user plane function network element obtains, based on the received session configuration information, the address of the access network node corresponding to the shared tunnel, so that the user plane function network element communicates with the access network node.

In at least one embodiment, after the session management network element sends the second shared tunnel establishment information to the access network node, the method further includes: The session management network element receives a session management context establishment request from an access and mobility management network element; the session management network element determines, based on the session management context establishment request, the shared tunnel established for the terminal device; the session management network element sends a session establishment information to the user plane function network element, where the session establishment information includes an identifier of the terminal device and the identifier of the shared tunnel; and the session management network element sends shared tunnel configuration information to the access and mobility management network element, where the shared tunnel configuration information includes the identifier of the shared tunnel and the address of the user plane function network element. In this solution, after the shared tunnel is established, the session management network element interacts with the access and mobility management network element, to establish a session context, so that the terminal device transmits data by using the shared tunnel.

At least one embodiment further provides an information processing method. The method includes: An access and mobility management network element receives a session establishment request from a terminal device; the access and mobility management network element determines, based on the session establishment request, a session management network element corresponding to the terminal device; and the access and mobility management network element sends a session management context establishment request to the session management network element. In this solution, after a shared tunnel is established between an access network node and a user plane function network element, to receive and send data by using the shared tunnel, the terminal device first triggers session establishment, and sends the session establishment request to the access and mobility management network element. The access and mobility management network element interacts with the session management network element, to successfully establish a session context, so that the terminal device transmits data by using the shared tunnel.

In at least one embodiment, the access and mobility management network element determines, based on the session establishment request, a session management network element corresponding to the terminal device includes: The access and mobility management network element determines group information of the terminal device based on the session establishment request; the access and mobility management network element sends the group information of the terminal device to a session selection network element; and the access and mobility management network element receives session management network element information determined by the session selection network element. In this solution, after receiving the session establishment request, the access and mobility management network element obtains the group information of the terminal device based on the session establishment request. For example, the access and mobility management network element obtains user group information of the terminal device from a user subscription data management entity. For example, the group information includes information such as a group identifier, a slice identifier, and a DNN. The session selection network element is an entity having a network element selection function. The session management network element corresponding to the user group information of the terminal device is preconfigured for the session selection network element, and the session selection network element sends the corresponding session management network element information to the access and mobility management network element based on the group information of the terminal device.

In at least one embodiment, after the access and mobility management network element sends the session management context establishment request to the session management network element, the method further includes: The access and mobility management network element receives shared tunnel establishment information from the session management network element, where the shared tunnel establishment information includes an identifier of a shared tunnel and an address of a user plane function network element; and the access and mobility management network element sends the shared tunnel establishment information to an access network node. In response to the shared tunnel being established for the terminal device, the session management network element may further obtain the identifier of the shared tunnel and the address of the user plane function network element, and then send the shared tunnel establishment information to the access and mobility management network element, so that the access and mobility management network element sends the shared tunnel establishment information to the access network node. The access network node may store the shared tunnel establishment information for subsequent data transmission of the terminal device.

At least one embodiment provides an information processing method. The method includes: An application function entity sends a tunnel establishment request to a core network control plane network element, where the tunnel establishment request is used to request to establish a shared tunnel for transmitting data by a terminal device; after receiving the tunnel establishment request, the core network control plane network element determines a tunnel configuration policy corresponding to the tunnel establishment request; the core network control plane network element selects a session management network element based on the tunnel establishment request; the core network control plane network element sends the tunnel configuration policy to the session management network element, where the tunnel configuration policy is used to indicate the session management network element to trigger establishment of the shared tunnel between an access network node and a user plane function network element; after receiving the tunnel configuration policy, the session management network element selects the user plane function network element based on the tunnel configuration policy and user plane function network element capability information, and the session management network element sends first shared tunnel establishment information to the user plane function network element; and the session management network element determines the access network node according to the tunnel configuration policy, and the session management network element sends second shared tunnel establishment information to the access network node, where the first shared tunnel establishment information and the second shared tunnel establishment information are used to establish the shared tunnel between the access network node and the user plane function network element.

In at least one embodiment, the application function entity needs to determine the terminal device that transmits data by using the shared tunnel, and the application function entity sends the tunnel establishment request to the core network control plane network element. The core network control plane network element sends the tunnel configuration policy to the session management network element, so that the session management network element determines the user plane function network element and the access network node. The user plane function network element and the access network node is the shared tunnel used by the terminal device to transmit data. In at least one embodiment, the shared tunnel requested by the application function entity to be established is used for transmitting data by the terminal device, so that the shared tunnel is dynamically established between the access network node and the user plane function network element based on a service configuration of the terminal device on the data transmission, and the shared tunnel that is dynamically established implements the data transmission of the terminal device.

In at least one embodiment, an application function entity sends a tunnel establishment request to a core network control plane network element includes: The application function entity sends the tunnel establishment request to a network exposure network element; and after receiving the tunnel establishment request from the application function entity, the network exposure network element sends the tunnel establishment request to the core network control plane network element. In this solution, the network exposure network element provides a network exposure interface, and the application function entity sends the tunnel establishment request to the core network control plane network element by using the network exposure network element, so that the core network control plane network element obtains the tunnel establishment request. This implements information exchange between the application function entity and the core network control plane network element.

In at least one embodiment, after the session management network element sends the second shared tunnel establishment information to the access network node, the method further includes: The session management network element receives a tunnel establishment response from the access network node, where the tunnel establishment response includes an address of the access network node corresponding to the shared tunnel; and after receiving the tunnel establishment response from the access network node, the session management network element sends session configuration information to the user plane function network element, where the session configuration information includes at least one of the following: an identifier of the shared tunnel and the address of the access network node corresponding to the shared tunnel. In this solution, after establishing the shared tunnel between the user plane function network element and the access network node, the access network node sends the tunnel establishment response to the session management network element. The tunnel establishment response includes the address of the access network node corresponding to the shared tunnel. The session management network element receives the tunnel establishment response from the access network node. The session management network element parses the tunnel establishment response, to obtain the address of the access network node corresponding to the shared tunnel. The session management network element then sends the session configuration information to the user plane function network element. The session configuration information includes at least one of the following: the identifier of the shared tunnel and the address of the access network node corresponding to the shared tunnel. Therefore, the user plane function network element obtains, based on the received session configuration information, the address of the access network node corresponding to the shared tunnel, so that the user plane function network element communicates with the access network node.

In at least one embodiment, after the session management network element sends the second shared tunnel establishment information to the access network node, the method further includes: An access and mobility management network element receives a session establishment request from the terminal device; the access and mobility management network element determines, based on the session establishment request, the session management network element corresponding to the terminal device; the access and mobility management network element sends a session management context establishment request to the session management network element; after receiving the session management context establishment request, the session management network element determines, based on the session management context establishment request, the shared tunnel established for the terminal device; the session management network element sends session establishment information to the user plane function network element, where the session establishment information includes an identifier of the terminal device and the identifier of the shared tunnel; and the session management network element sends shared tunnel configuration information to the access and mobility management network element, where the shared tunnel configuration information includes the identifier of the shared tunnel and an address of the user plane function network element. In this solution, after the shared tunnel is established, the session management network element interacts with the access and mobility management network element, to successfully establish a session context, so that the terminal device transmits data by using the shared tunnel.

In at least one embodiment, the access and mobility management network element determines, based on the session establishment request, the session management network element corresponding to the terminal device includes: The access and mobility management network element determines group information of the terminal device based on the session establishment request; the access and mobility management network element sends the group information of the terminal device to a session selection network element; and the access and mobility management network element receives session management network element information determined by the session selection network element. In this solution, after receiving the session establishment request, the access and mobility management network element obtains the group information of the terminal device based on the session establishment request. For example, the access and mobility management network element obtains user group information of the terminal device from a user subscription data management entity. For example, the group information includes information such as a group identifier, a slice identifier, and a DNN. The session selection network element is an entity having a network element selection function. The session management network element corresponding to the user group information of the terminal device is preconfigured for the session selection network element, and the session selection network element sends the corresponding session management network element information to the access and mobility management network element based on the group information of the terminal device.

In at least one embodiment, after the access and mobility management network element sends the session management context establishment request to the session management network element, the method further includes: The access and mobility management network element receives shared tunnel establishment information from the session management network element, where the shared tunnel establishment information includes the identifier of the shared tunnel and the address of the user plane function network element; and the access and mobility management network element sends the shared tunnel establishment information to the access network node. In response to the shared tunnel being established for the terminal device, the session management network element may further obtain the identifier of the shared tunnel and the address of the user plane function network element, and then send the shared tunnel establishment information to the access and mobility management network element, so that the access and mobility management network element sends the shared tunnel establishment information to the access network node. The access network node may store the shared tunnel establishment information for subsequent data transmission of the terminal device.

At least one embodiment provides a communication apparatus. The communication apparatus is a core network control plane network element, and includes: a receiving module, configured to receive a tunnel establishment request from an application function entity, where the tunnel establishment request is used to request to establish a shared tunnel for transmitting data by a terminal device; a processing module, configured to determine a tunnel configuration policy corresponding to the tunnel establishment request, where the processing module is configured to select a session management network element based on the tunnel establishment request; and a sending module, configured to send the tunnel configuration policy to the session management network element, where the tunnel configuration policy is used to indicate the session management network element to trigger establishment of the shared tunnel between an access network node and a user plane function network element.

In at least one embodiment, the receiving module is configured to receive the tunnel establishment request from a network exposure network element, where the network exposure network element receives the tunnel establishment request from the application function entity.

In at least one embodiment, the processing module is configured to obtain a group configuration policy corresponding to the terminal device; and the core network control plane network element generates the tunnel configuration policy based on the tunnel establishment request and the group configuration policy.

In at least one embodiment, the tunnel establishment request includes at least one of the following: first group information corresponding to the terminal device, service information corresponding to the shared tunnel, quality of service information corresponding to the shared tunnel, and network area information corresponding to the shared tunnel.

In at least one embodiment, the tunnel configuration policy includes at least one of the following: second group information corresponding to the terminal device, an identifier of the shared tunnel, the quality of service information corresponding to the shared tunnel, and the network area information corresponding to the shared tunnel.

In at least one embodiment, the modules constituting the communication apparatus further performs the steps described in the herein.

At least one embodiment provides a communication apparatus. The communication apparatus is a session management network element, and includes: a receiving module, configured to receive a tunnel configuration policy from a core network control plane network element; a processing module, configured to select a user plane function network element based on the tunnel configuration policy and user plane function network element capability information; and a sending module, configured to send first shared tunnel establishment information to the user plane function network element. The processing module is configured to determine an access network node according to the tunnel configuration policy; and the sending module is configured to send second shared tunnel establishment information to the access network node, where the first shared tunnel establishment information and the second shared tunnel establishment information are used to establish a shared tunnel between the access network node and the user plane function network element.

In at least one embodiment, the first shared tunnel establishment information includes at least one of the following: an identifier of the shared tunnel and quality of service information corresponding to the shared tunnel.

In at least one embodiment, the second shared tunnel establishment information includes at least one of the following: the identifier of the shared tunnel, the quality of service information corresponding to the shared tunnel, and an address of the user plane function network element.

In at least one embodiment, the receiving module is configured to: after the sending module sends the second shared tunnel establishment information to the access network node, receive a tunnel establishment response from the access network node, where the tunnel establishment response includes an address of the access network node corresponding to the shared tunnel.

In at least one embodiment, the sending module is configured to: after the receiving module receives the tunnel establishment response from the access network node, send session configuration information to the user plane function network element, where the session configuration information includes at least one of the following: the identifier of the shared tunnel and the address of the access network node corresponding to the shared tunnel.

In at least one embodiment, the receiving module is configured to: after the sending module sends the second shared tunnel establishment information to the access network node, receive a session management context establishment request from an access and mobility management network element; the processing module is configured to determine, based on the session management context establishment request, the shared tunnel established for a terminal device; and the sending module is configured to send session establishment information to the user plane function network element, where the session establishment information includes an identifier of the terminal device and the identifier of the shared tunnel, and send shared tunnel configuration information to the access and mobility management network element, where the shared tunnel configuration information includes the identifier of the shared tunnel and the address of the user plane function network element.

In at least one embodiment, the modules constituting the communication apparatus further performs the steps described herein.

At least one embodiment provides a communication apparatus. The communication apparatus is an access and mobility management network element, and includes: a receiving module, configured to receive a session establishment request from a terminal device; a processing module, configured to determine, based on the session establishment request, a session management network element corresponding to the terminal device; and a sending module, configured to send a session management context establishment request to the session management network element.

In at least one embodiment, the processing module is configured to determine group information of the terminal device based on the session establishment request; the sending module is configured to send the group information of the terminal device to a session selection network element; and the receiving module is configured to receive session management network element information determined by the session selection network element.

In at least one embodiment, the receiving module is configured to: after the sending module sends the session management context establishment request to the session management network element, receive shared tunnel establishment information from the session management network element, where the shared tunnel establishment information includes an identifier of a shared tunnel and an address of a user plane function network element; and the sending module is configured to send the shared tunnel establishment information to an access network node.

In at least one embodiment, the modules constituting the communication apparatus further perform the steps described herein.

At least one embodiment provides a communication apparatus. The communication apparatus includes entities such as a core network control plane network element, a session management network element, and an access and mobility management network element. The communication apparatus includes a processor. Optionally, the communication apparatus further includes a memory. The memory is configured to store instructions, and the processor is configured to execute the instructions in the memory, to enable the communication apparatus to perform the method according to at least one embodiment.

At least one embodiment provides a chip system. The chip system includes a processor, configured to support a core network control plane network element, a session management network element, and an access and mobility management network element in implementing functions in at least one embodiment, for example, sending or processing data and/or information in the foregoing methods. In at least one embodiment, the chip system further includes a memory. The memory is configured to store program instructions and data used in the core network control plane network element, the session management network element, and the access and mobility management network element. The chip system includes a chip, or includes a chip and another discrete component.

At least one embodiment provides a communication system. The communication system includes a core network control plane network element, a session management network element, and an access and mobility management network element, where the core network control plane network element is configured to perform the method according to at least one embodiment;

the session management network element is configured to perform the method according to at least one embodiment; and the access and mobility management network element is configured to perform the method according to at least one embodiment.

An application function entity sends a tunnel establishment request to the core network control plane network element, where the tunnel establishment request is used to request to establish a shared tunnel for transmitting data by a terminal device; after receiving the tunnel establishment request, the core network control plane network element determines a tunnel configuration policy corresponding to the tunnel establishment request; the core network control plane network element selects the session management network element based on the tunnel establishment request; the core network control plane network element sends the tunnel configuration policy to the session management network element, where the tunnel configuration policy is used to indicate the session management network element to trigger establishment of the shared tunnel between an access network node and a user plane function network element; after receiving the tunnel configuration policy, the session management network element selects the user plane function network element based on the tunnel configuration policy and user plane function network element capability information, and the session management network element sends first shared tunnel establishment information to the user plane function network element; and the session management network element determines the access network node according to the tunnel configuration policy, and the session management network element sends second shared tunnel establishment information to the access network node, where the first shared tunnel establishment information and the second shared tunnel establishment information are used to establish the shared tunnel between the access network node and the user plane function network element.

At least one embodiment provides a computer-readable storage medium. The computer-readable storage medium stores instructions, and in response to the instructions being run on a computer, the computer is enabled to perform the method according to at least one embodiment.

At least one embodiment provides a computer program product including instructions. In response to the computer program product running on a computer, the computer is enabled to perform the method according to at least one embodiment.

DESCRIPTION OF EMBODIMENTS

Figure 1:
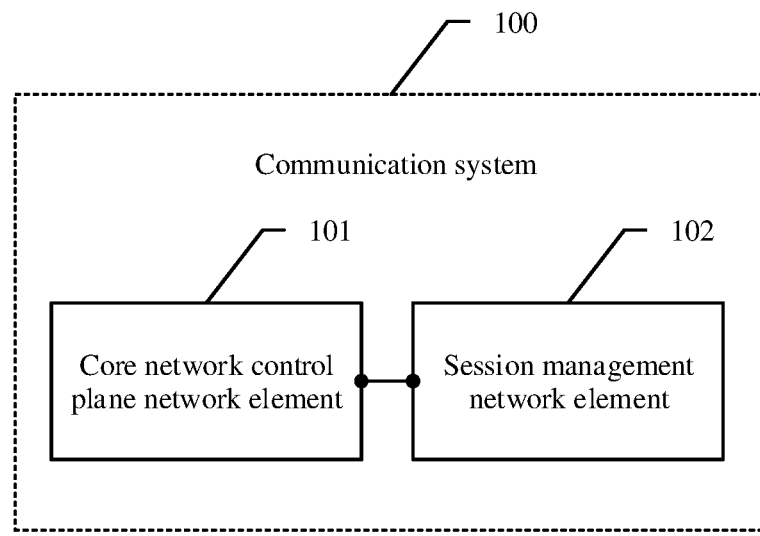
FIG. 1 is a schematic diagram of a system architecture of a communication system according to at least one embodiment.

At least one embodiment provides an information processing method, a communication apparatus, and a communication system, to establish a shared tunnel between an access network node and a user plane function network element, so that a terminal device transmits data based on the shared tunnel.

The following describes at least one embodiment with reference to the accompanying drawings.

In the specification, claims, and accompanying drawings of this application, the terms "first", "second", and so on are intended to distinguish between similar objects but do not necessarily indicate a specific order or sequence. The terms used in such a way are interchangeable in proper circumstances, which is merely a discrimination manner that is used in response to objects having a same attribute, and are described in at least one embodiment. In addition, the terms "include", "contain" and any other variants mean to cover the non-exclusive inclusion, so that a process, method, system, product, or device that includes a series of units is not necessarily limited to those units, but includes other units not expressly listed or inherent to such a process, method, system, product, or device.

The technical solutions in at least one embodiment are applied to various communication systems for data processing, for example, a code division multiple access (code division multiple access, CDMA) system, a time division multiple access (time division multiple access, TDMA) system, a frequency division multiple access (frequency division multiple access, FDMA) system, an orthogonal frequency division multiple access (orthogonal frequency division multiple access, OFDMA) system, a single-carrier frequency division multiple access (single-carrier FDMA, SC-FDMA) system, and another system. The terms "system" and "network" are interchangeable. The CDMA system implements wireless technologies such as universal terrestrial radio access (universal terrestrial radio access, UTRA) and CDMA2000. The UTRA includes a wideband CDMA (wideband CDMA, WCDMA) technology and another variant technology of CDMA. The CDMA2000 covers the interim standard (interim standard, IS) 2000 (IS-2000), the IS-95, and the IS-856 standard. The TDMA system implements wireless technologies such as a global system for mobile communications (global system for mobile communications, GSM). The OFDMA system implements wireless technologies such as evolved universal terrestrial radio access (evolved UTRA, E-UTRA), ultra mobile broadband (ultra mobile broadband, UMB), IEEE 802.11 (Wi-Fi), IEEE 802.16 (WiMAX), IEEE 802.20, and Flash OFDMA. The UTRA is a UMTS, and the E-UTRA is an evolved version of the UMTS. A new version of the UMTS that uses the E-UTRA is used in long term evolution (long term evolution, LTE) and various versions evolved based on LTE in 3GPP. A 5th generation (5th Generation, "5G" for short) communication system or new radio (New Radio, "NR" for short) is a next generation communication system under study. In addition, the communication system is further applicable to a future-oriented communication technology, and is applicable to the technical solutions provided in at least one embodiment. A system architecture and a service scenario described in at least one embodiment are intended to describe the technical solutions in at least one embodiment more clearly, and do not constitute a limitation on the technical solutions provided in at least one embodiment. A person of ordinary skill in the art may know that, with evolution of a system architecture and emergence of a new service scenario, the technical solutions provided in at least one embodiment are also applicable to similar technical problems.

FIG. 1 shows a communication system 100 according to at least one embodiment. The communication system 100 includes a core network control plane network element 101 and a session management network element 102.

The core network control plane network element 101 is configured to receive a tunnel establishment request from an application function entity, where the tunnel establishment request is used to request to establish a shared tunnel for transmitting data by a terminal device;

after receiving the tunnel establishment request, determine a tunnel configuration policy corresponding to the tunnel establishment request;

select the session management network element based on the tunnel establishment request; and send the tunnel configuration policy to the session management network element 102, where the tunnel configuration policy is used to indicate the session management network element to trigger establishment of the shared tunnel between an access network node and a user plane function network element.

The session management network element 102 is configured to: after receiving the tunnel configuration policy, select the user plane function network element based on the tunnel configuration policy and user plane function network element capability information, and send first shared tunnel establishment information to the user plane function network element; and determine the access network node according to the tunnel configuration policy, and send second shared tunnel establishment information to the access network node, where the first shared tunnel establishment information and the second shared tunnel establishment information are used to establish the shared tunnel between the access network node and the user plane function network element.

The communication system 100 includes a plurality of session management network elements 102. The core network control plane network element 101 selects one session management network element 102 from the plurality of session management network elements 102 based on the tunnel establishment request from the application function entity, and then send the tunnel configuration policy to the selected session management network element 102.

The core network control plane network element 101 is a control entity having a policy decision function. For example, the core network control plane network element 101 is a policy control function entity (policy control function, PCF) in a core network of a 5G network. A main function of the PCF is to serve as a policy decision point, and the PCF provides rules such as detection that is based on a service data flow and an application, data transmission threshold control, quality of service (quality of service, QoS), and flow-based charging control. Specifically, the core network control plane network element 101 selects one session management network element 102 from the plurality of session management network elements 102, and send the tunnel configuration policy to the session management network element 102, so that the session management network element 102 triggers the establishment of the shared tunnel. the core network control plane network element 101 is alternatively another entity having a control decision function in another network (for example, a 6G network). This is not limited herein.

The session management network element 102 is various entities having a session management function. For example, the session management network element 102 is a session management function entity (session management function, SMF) in a 5G network. A main function of the SMF is to control establishment, modification, and deletion of a session, select a user plane node, and the like. Specifically, the session management network element 102 receives the tunnel configuration policy, and trigger the establishment of the shared tunnel. it is not limited that the session management network element 102 is alternatively another entity having a session management function in another network (for example, a 6G network). This is not limited herein.

Figure 2:
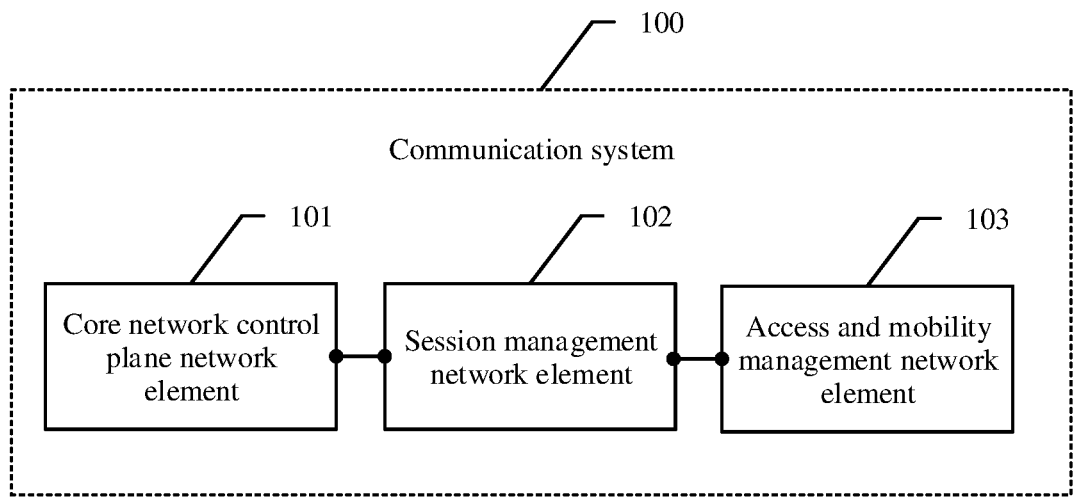
FIG. 2 is a schematic diagram of a system architecture of another communication system according to at least one embodiment.

FIG. 2 shows a communication system 100 according to at least one embodiment. In addition to a core network control plane network element 101 and a session management network element 102, the communication system 100 further includes an access and mobility management network element 103.

The access and mobility management network element 103 is configured to receive a session establishment request from a terminal device;

determine, based on the session establishment request, the session management network element 102 corresponding to the terminal device; and send a session management context establishment request to the session management network element 102.

The session management network element 102 is configured to: after receiving the session management context establishment request, determine, based on the session management context establishment request, a shared tunnel established for the terminal device;

send session establishment information to a user plane function network element, where the session establishment information includes an identifier of the terminal device and an identifier of the shared tunnel; and send shared tunnel configuration information to the access and mobility management network element 103, where the shared tunnel configuration information includes the identifier of the shared tunnel and an address of the user plane function network element.

The access and mobility management network element 103 is an entity used for access and mobility management of the terminal device. For example, the access and mobility management network element 103 is an access and mobility management function entity (access and mobility management function, AMF) in a core network of a 5G network. A main function of the AMF includes user registration management, accessibility detection, SMF selection, mobility status switching management, and the like. The access and mobility management network element 103 selects the session management network element 102 based on the session establishment request of the terminal device, and sends the session management context establishment request to the session management network element 102. The access and mobility management network element 103 is alternatively an entity, having an access and mobility management function for the terminal device, in another network (for example, a 6G network). This is not limited herein.

Figure 3:
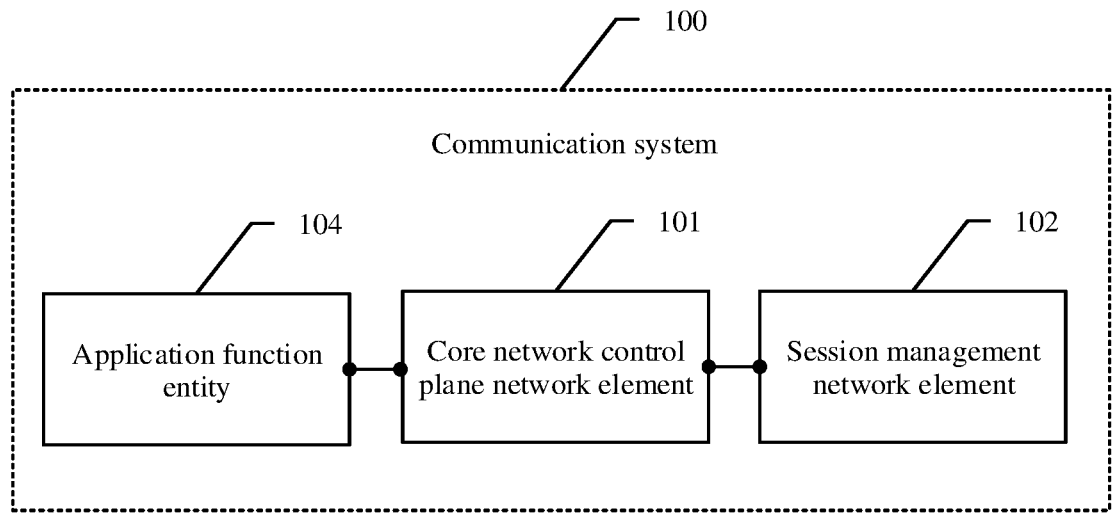
FIG. 3 is a schematic diagram of a system architecture of another communication system according to at least one embodiment.

FIG. 3 shows a communication system 100 according to at least one embodiment. In addition to a core network control plane network element 101 and a session management network element 102, the communication system 100 further includes an application function entity 104.

The application function entity 104 is configured to send a tunnel establishment request to the core network control plane network element 101, where the tunnel establishment request is used to request to establish a shared tunnel for transmitting data by a terminal device.

The application function entity 104 is an entity that provides policy support for a core network. For example, the application function entity 104 is an application function entity (application function, AF) in a 5G network. A main function of the AF is to interact with a 3GPP core network to provide a service, to affect service flow routing, access network exposure, policy control, and the like. The application function entity 104 obtains user group information, service information, QoS information, network area information, and the like of the terminal device, and then the application function entity 104 requests to establish the shared tunnel for transmitting data by the terminal device. it is not limited that the application function entity 104 is alternatively an entity having an application function in another network (for example, a 6G network). This is not limited herein.

Figure 4:
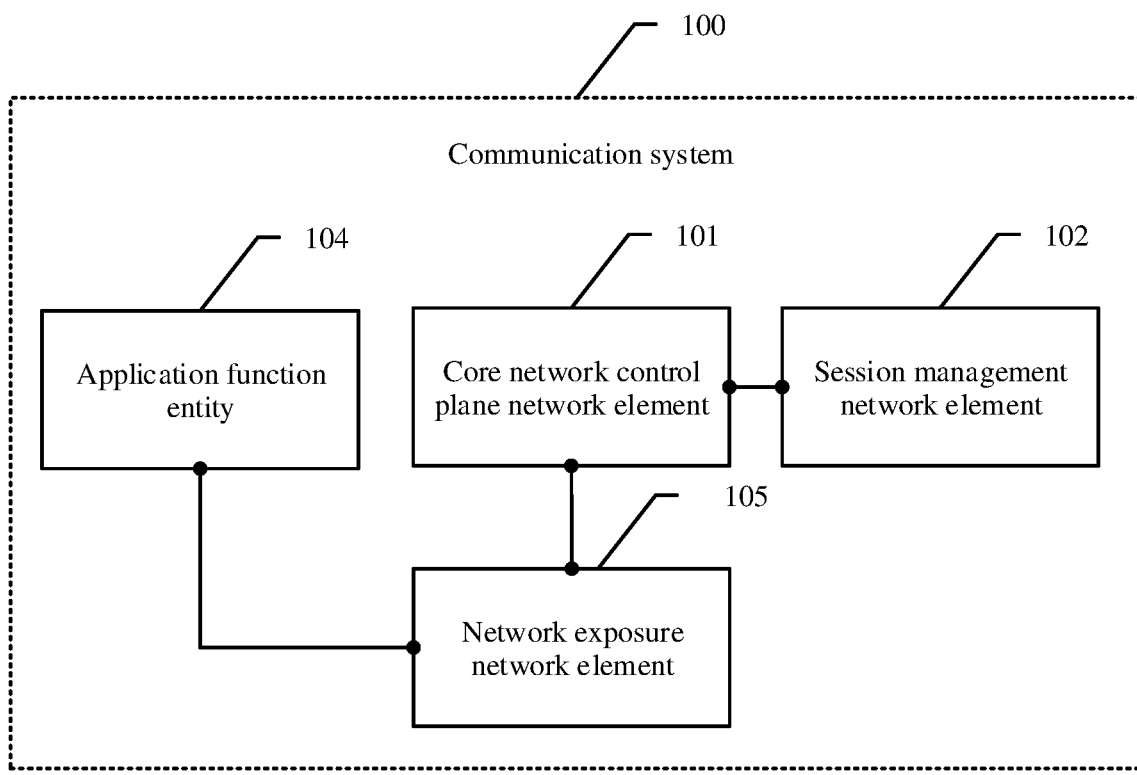
FIG. 4 is a schematic diagram of a system architecture of another communication system according to at least one embodiment.

FIG. 4 shows a communication system 100 according to at least one embodiment. In addition to a core network control plane network element 101 and a session management network element 102, the communication system 100 further includes an application function entity 104 and a network exposure network element 105.

The application function entity 104 is configured to send a tunnel establishment request to the network exposure network element 105; and the network exposure network element 105 is configured to: after receiving the tunnel establishment request from the application function entity 104, send the tunnel establishment request to the core network control plane network element 101.

The network exposure network element 105 is an entity having a network exposure function. For example, the network exposure network element 105 is a network exposure function entity (network exposure function, NEF) in a 5G network. The NEF has a capability of securely exposing a service, such as a third party, edge computing, or AF connection, provided by a 3GPP network function. For example, the network exposure network element 105 provides a network exposure interface, so that the application function entity 104 sends the tunnel establishment request to the core network control plane network element 101 by using the network exposure network element 105.

Figure 5:
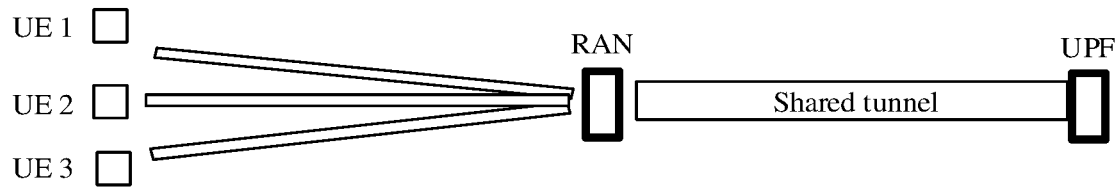
FIG. 5 is a schematic diagram of establishing a shared tunnel between a RAN and a UPF according to at least one embodiment.

In at least one embodiment, the session management network element sends first shared tunnel establishment information to a user plane function network element; and the session management network element further sends second shared tunnel establishment information to an access network node. The first shared tunnel establishment information and the second shared tunnel establishment information are used to establish the shared tunnel between the access network node and the user plane function network element. FIG. 5 is a schematic diagram of establishing a shared tunnel between a RAN and a UPF according to at least one embodiment. For example, a plurality of IoT UEs share a same data transmission tunnel, so that signaling overheads caused by establishing a separate data transmission tunnel for an IoT UE are avoided. For example, UE 1, UE 2, and UE 3 use the shared tunnel between the RAN and the UPF in response to transmitting data. The IoT UEs is of a same device type (for example, water meter devices belonging to a same building), or is IoT devices having a same service configuration, for example, meter reading devices that use a low data volume and operate without a particular transmission delay, including IoT devices such as a water meter, an electricity meter, and a gas meter.

Figure 6:
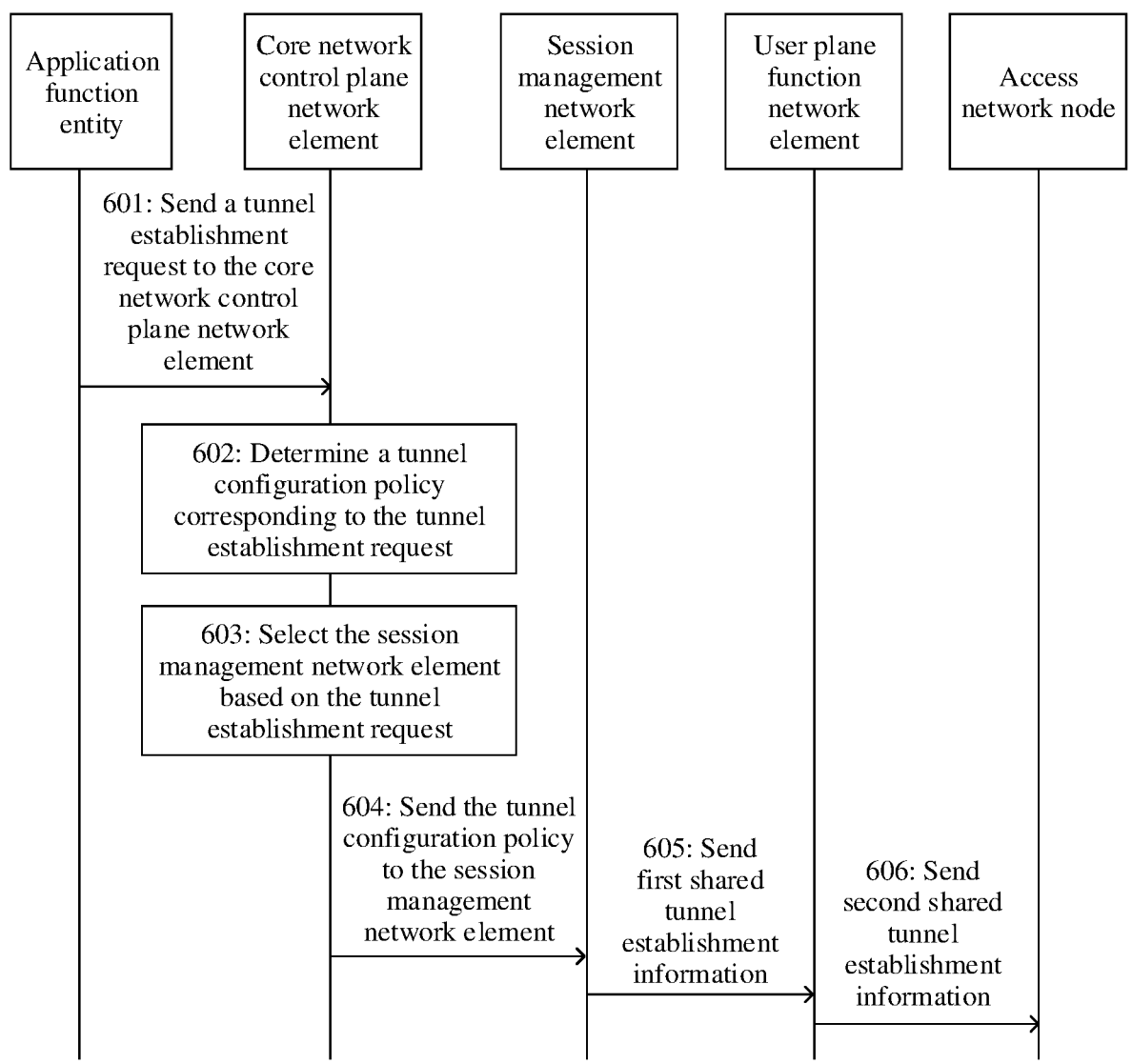
FIG. 6 is a schematic block diagram of an interaction procedure of an information processing method according to at least one embodiment.

Based on the communication systems shown in FIG. 1 to FIG. 4, the communication systems is used to simplify a network architecture in which a large quantity of IoT terminals access a 5G network. In the communication systems, a shared tunnel dedicated to the terminals is established for the large quantity of IoT terminals, and the shared tunnel is dynamically created for an IoT service application, so that the 5G network can provide an IoT service more flexibly and effectively. At least one embodiment further provides an information processing method. As shown in FIG. 6, the method includes the following steps.

601: An application function entity sends a tunnel establishment request to a core network control plane network element, where the tunnel establishment request is used to request to establish a shared tunnel for transmitting data by a terminal device.

The application function entity obtains information in response to the terminal device transmitting data. For example, the application function entity obtains at least one of the following information: user group information, service information, QoS information, and network area information of the terminal device. The application function entity generates the tunnel establishment request in response to the terminal device using the shared tunnel, where the tunnel establishment request is used to request to establish the shared tunnel for transmitting data by the terminal device. Then, the application function entity sends the tunnel establishment request to the core network control plane network element, to establish and update the shared tunnel.

In at least one embodiment, the tunnel establishment request includes at least one of the following: first group information corresponding to the terminal device, service information corresponding to the shared tunnel, quality of service information corresponding to the shared tunnel, and network area information corresponding to the shared tunnel.

The first group information is used to identify a user group corresponding to the shared tunnel, and is specifically a user group identifier (group ID). The service information is used to describe a service corresponding to the shared tunnel, and is information such as an internet protocol (internet protocol, IP) address and a port number of the service. The QoS information is used to describe a QoS configuration that is of a service application and that is on the shared tunnel, and is, for example, a data transmission rate (namely, a bandwidth) and an end-to-end delay provided by the shared tunnel. The network area information is used by the core network control plane network element to determine a range for establishing the shared tunnel, and is specific geographical area information. Information content carried by the tunnel establishment request is determined based on a specific scenario. This is not limited herein.

In at least one embodiment, that an application function entity sends a tunnel establishment request to a core network control plane network element in step 601 includes:

The application function entity sends the tunnel establishment request to a network exposure network element; and after receiving the tunnel establishment request from the application function entity, the network exposure network element sends the tunnel establishment request to the core network control plane network element.

The network exposure network element provides a network exposure interface, and the application function entity sends the tunnel establishment request to the core network control plane network element by using the network exposure network element, so that the core network control plane network element obtains the tunnel establishment request. This implements information exchange between the application function entity and the core network control plane network element.

In at least one embodiment, the core network control plane network element is determined by the network exposure network element based on the tunnel establishment request or configuration information of the network exposure network element.

The communication system includes a plurality of core network control plane network elements. The network exposure network element selects one core network control plane network element from the plurality of core network control plane network elements, and then send the tunnel establishment request to the core network control plane network element. The configuration information of the network exposure network element refers to a local configuration of the network exposure network element, and the core network control plane network element corresponding to the tunnel establishment request is determined based on the local configuration.

602: After receiving the tunnel establishment request, the core network control plane network element determines a tunnel configuration policy corresponding to the tunnel establishment request.

In at least one embodiment, the core network control plane network element obtains the tunnel establishment request from the application function entity, and the core network control plane network element determines, by parsing the tunnel establishment request, that the shared tunnel is established for the terminal device. For example, the tunnel establishment request includes at least one of the following information: the user group information, the service information, the QoS information, and the network area information of the terminal device. Therefore, the core network control plane network element obtains, based on the user group information, information about a group in which the terminal device is located, and obtain, based on the service information, a type of a service that is transmitted in the shared tunnel. The core network control plane network element obtains, based on the QoS information, a QoS configuration that is of the service application and that is on the shared tunnel. The core network control plane network element obtains, based on the network area information, a range for establishing the shared tunnel.

In at least one embodiment, the tunnel configuration policy includes at least one of the following: second group information corresponding to the terminal device, an identifier of the shared tunnel, the quality of service information corresponding to the shared tunnel, and the network area information corresponding to the shared tunnel.

Specifically, after obtaining the tunnel establishment request, the core network control plane network element generates and determine the tunnel configuration policy corresponding to the tunnel establishment request. The tunnel configuration policy is also referred to as a shared tunnel configuration policy, and includes policy information used for establishing the shared tunnel. For example, the tunnel configuration policy includes at least one of the following: the second user group information of the terminal device, the identifier of the shared tunnel, the QoS information, and the network area information.

The second group information corresponding to the terminal device includes at least one of the following: a group identifier, a data network name, and a network slice identifier that correspond to the terminal device.

The user group information is a user group identifier, or the core network control plane network element maps the user group identifier to a corresponding unique identifier based on a local configuration. For example, the unique identifier obtained through mapping by using the user group identifier includes a data network name (data network name, DNN), a network slice identifier (single network slice selection assistance information, S-NSSAI), or the like.

In at least one embodiment, that the core network control plane network element determines a tunnel configuration policy corresponding to the tunnel establishment request includes:

The core network control plane network element obtains a group configuration policy corresponding to the terminal device; and the core network control plane network element generates the tunnel configuration policy based on the tunnel establishment request and the group configuration policy.

The group configuration policy corresponding to the terminal device is a group (group) policy of an operator. The core network control plane network element obtains, from the tunnel establishment request, a configuration (for example, QoS information and network area information) of the terminal device and that is on the shared tunnel. The core network control plane network element determines, based on shared tunnel configuration information provided by the application function entity and the group policy of the operator, the tunnel configuration policy corresponding to the tunnel establishment request. For example, the tunnel configuration policy includes user group information, an identifier of the shared tunnel, the QoS information, and the network area information.

603: The core network control plane network element selects a session management network element based on the tunnel establishment request.

The communication system includes a plurality of session management network elements. The core network control plane network element selects one session management network element from the plurality of session management network elements based on the tunnel establishment request from the application function entity. For example, the tunnel establishment request includes the network area information, and the core network control plane network element selects, from the plurality of session management network elements based on the network area information, a session management network element that matches the network area information.

There is no sequence between step 603 and step 604. Step 603 is performed before step 604, or step 604 is performed before step 603, or the two steps are simultaneously performed. This is not limited herein.

604: The core network control plane network element sends the tunnel configuration policy to the session management network element, where the tunnel configuration policy is used to indicate the session management network element to trigger establishment of the shared tunnel between an access network node and a user plane function network element.

In at least one embodiment, after the core network control plane network element selects the session management network element based on the tunnel establishment request, the core network control plane network element sends the tunnel configuration policy to the selected session management network element, so that the session management network element obtains the tunnel configuration policy.

The tunnel configuration policy is used to indicate the session management network element to trigger the establishment of the shared tunnel between the access network node and the user plane function network element. For example, the tunnel configuration policy includes at least one of the following: the user group information of the terminal device, the identifier of the shared tunnel, the QoS information, and the network area information. Therefore, the session management network element obtains, based on the user group information, the information about the group in which the terminal device is located, and obtain, based on the service information, the type of the service that is transmitted in the shared tunnel. The session management network element obtains, based on the QoS information, the QoS configuration that is of the service application and that is on the shared tunnel. The session management network element obtains, based on the network area information, the range for establishing the shared tunnel.

In at least one embodiment, after the core network control plane network element sends the tunnel configuration policy to the session management network element in step 604, the information processing method provided In at least one embodiment further includes:

The core network control plane network element receives a tunnel configuration result from the session management network element; and the core network control plane network element sends the tunnel configuration result to the application function entity.

After the establishment of the shared tunnel between the access network node and the user plane function network element is completed, the session management network element sends the tunnel configuration result, so that the core network control plane network element receives the tunnel configuration result from the session management network element. The core network control plane network element sends the tunnel configuration result to the application function entity, so that the application function entity obtains the tunnel configuration result. The application function entity determines, based on the tunnel configuration result, that the establishment of the shared tunnel between the access network node and the user plane function network element is completed.

605: After receiving the tunnel configuration policy, the session management network element selects the user plane function network element based on the tunnel configuration policy and user plane function network element capability information, and sends first shared tunnel establishment information to the user plane function network element.

In at least one embodiment, the session management network element obtains the tunnel configuration policy from the core network control plane network element. The session management network element stores the user plane function network element capability information, and matches capability information of a plurality of user plane function network elements according to the tunnel configuration policy, to determine an available user plane function network element. For example, the user plane function network element capability information includes whether the user plane function network element supports the shared tunnel, and the session management network element selects the user plane function network element from a plurality of user plane function network elements that support the shared tunnel. For example, the tunnel configuration policy includes the network area information, and the session management network element alternatively selects the user plane function network element based on the network area information and the user plane function network element capability information. For example, the selected user plane function network element matches the network area information.

In at least one embodiment, the session management network element sends the first shared tunnel establishment information to the user plane function network element. The first shared tunnel establishment information includes at least one of the following: the identifier of the shared tunnel and the quality of service information corresponding to the shared tunnel. The identifier of the shared tunnel and the quality of service information corresponding to the shared tunnel is used by the user plane function network element to establish the shared tunnel, so that the user plane function network element establishes the shared tunnel.

606: The session management network element determines the access network node according to the tunnel configuration policy, and sends second shared tunnel establishment information to the access network node, where the first shared tunnel establishment information and the second shared tunnel establishment information are used to establish the shared tunnel between the access network node and the user plane function network element.

In at least one embodiment, the session management network element obtains the tunnel configuration policy from the core network control plane network element, and determines the access network node according to the tunnel configuration policy. For example, the tunnel configuration policy includes the network area information, and the session management network element alternatively determines the access network node based on the network area information. For example, the access network node matches the network area information.

In at least one embodiment, the session management network element sends the second shared tunnel establishment information to the access network node. The first shared tunnel establishment information and the second shared tunnel establishment information are used to establish the shared tunnel between the access network node and the user plane function network element. Specifically, the first shared tunnel establishment information is used by the user plane function network element to establish the shared tunnel, and the second shared tunnel establishment information is used by the access network node to establish the shared tunnel. A shared tunnel establishment procedure is not described in detail herein.

In at least one embodiment, the second shared tunnel establishment information includes at least one of the following: the identifier of the shared tunnel, the quality of service information corresponding to the shared tunnel, and an address of the user plane function network element. The access network node determines, based on the address of the user plane function network element, that the shared tunnel is established with the user plane function network element. The identifier of the shared tunnel and the quality of service information corresponding to the shared tunnel is used by the access network node to establish the shared tunnel, so that the access network node establishes the shared tunnel.

In at least one embodiment, after the session management network element sends the second shared tunnel establishment information to the access network node in step 606, the information processing method provided In at least one embodiment further includes:

The session management network element receives a tunnel establishment response from the access network node, where the tunnel establishment response includes an address of the access network node corresponding to the shared tunnel; and after receiving the tunnel establishment response from the access network node, the session management network element sends session configuration information to the user plane function network element, where the session configuration information includes at least one of the following: the identifier of the shared tunnel and the address of the access network node corresponding to the shared tunnel.

After establishing the shared tunnel between the user plane function network element and the access network node, the access network node sends the tunnel establishment response to the session management network element. The tunnel establishment response includes the address of the access network node corresponding to the shared tunnel. The session management network element receives the tunnel establishment response from the access network node. The session management network element parses the tunnel establishment response, to obtain the address of the access network node corresponding to the shared tunnel. The session management network element then sends the session configuration information to the user plane function network element. The session configuration information includes at least one of the following: the identifier of the shared tunnel and the address of the access network node corresponding to the shared tunnel. Therefore, the user plane function network element obtains, based on the received session configuration information, the address of the access network node corresponding to the shared tunnel, so that the user plane function network element communicates with the access network node.

In at least one embodiment, after the session management network element sends the session configuration information to the user plane function network element, the method provided In at least one embodiment further includes:

The session management network element sends the tunnel configuration result to the core network control plane network element.

After the establishment of the shared tunnel between the access network node and the user plane function network element is completed, the session management network element sends the tunnel configuration result, so that the core network control plane network element receives the tunnel configuration result from the session management network element. The core network control plane network element sends the tunnel configuration result to the application function entity, so that the application function entity obtains the tunnel configuration result. The application function entity determines, based on the tunnel configuration result, that the establishment of the shared tunnel between the access network node and the user plane function network element is completed.

In the example descriptions of the foregoing embodiment, the application function entity determines the terminal device that transmits data by using the shared tunnel, and the application function entity sends the tunnel establishment request to the core network control plane network element. The core network control plane network element sends the tunnel configuration policy to the session management network element, so that the session management network element determines the user plane function network element and the access network node. The user plane function network element and the access network node is the shared tunnel used by the terminal device to transmit data. In at least one embodiment, the shared tunnel requested by the application function entity to be established is used for transmitting data by the terminal device, so that the shared tunnel is dynamically established between the access network node and the user plane function network element based on a service configuration of the terminal device on the data transmission, and the shared tunnel that is dynamically established to implement the data transmission of the terminal device.

Figure 7A:
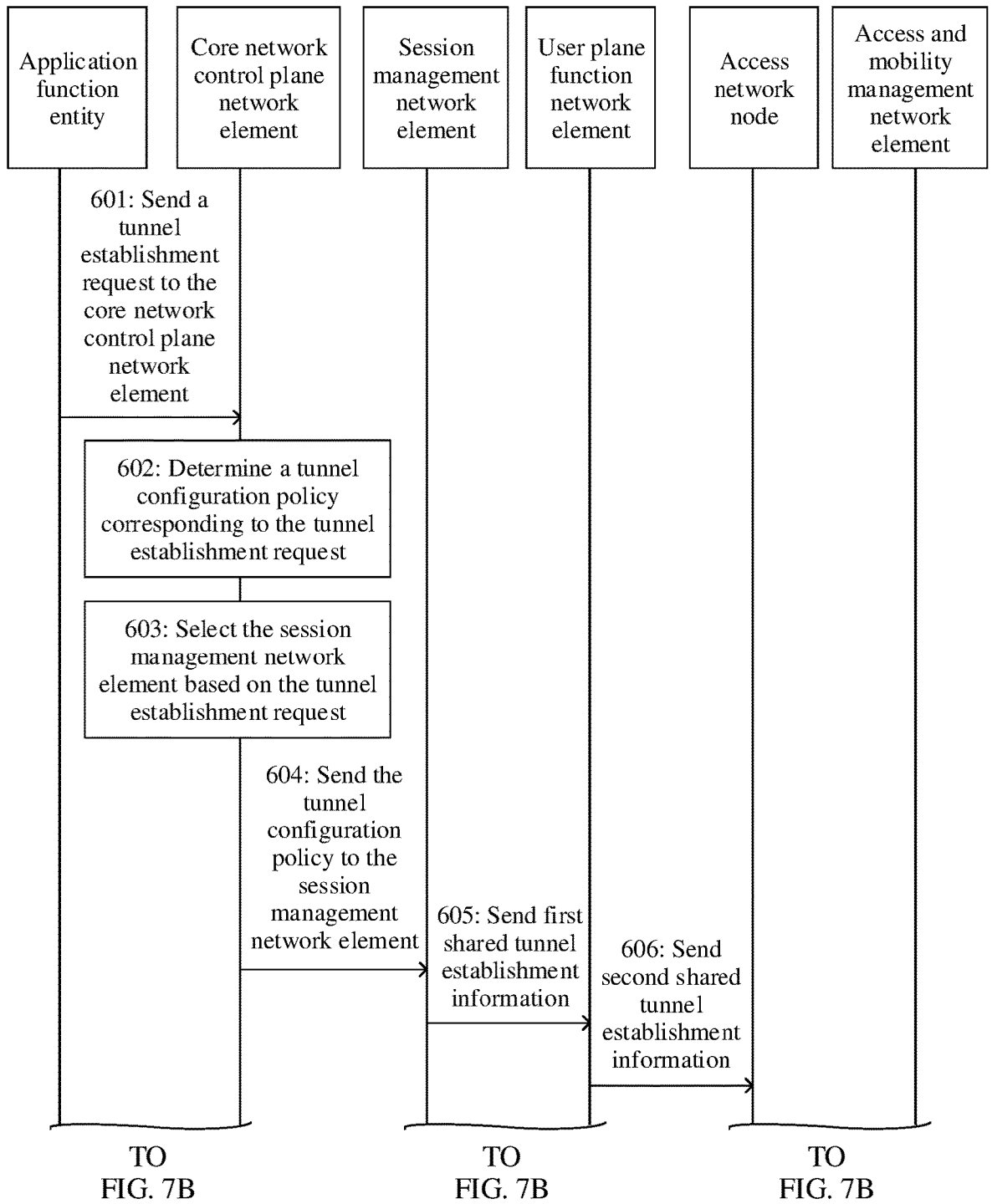
FIG. 7A and FIG. 7B are a schematic block diagram of an interaction procedure of another information processing method according to at least one embodiment.
Figure 7B:
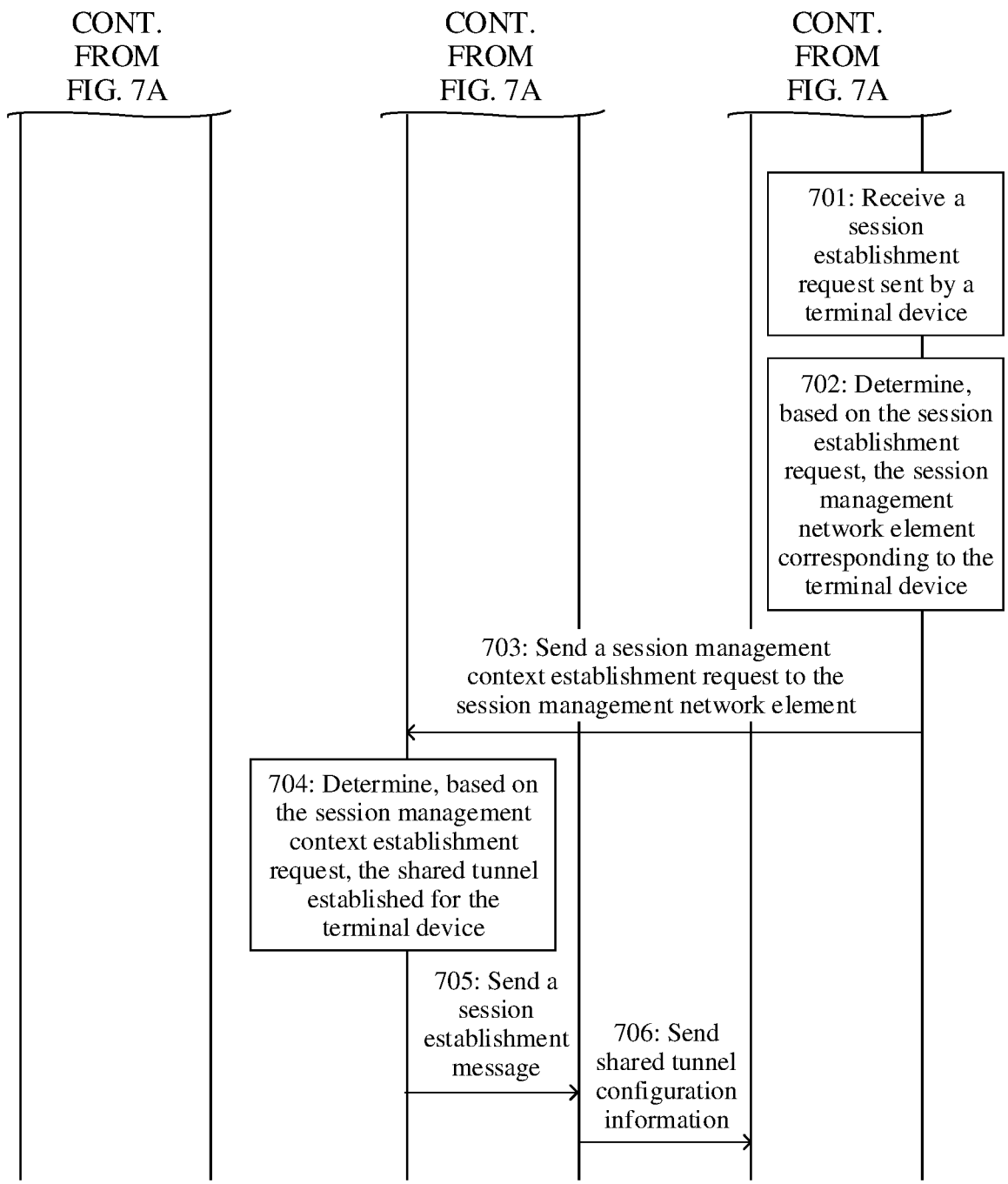

FIG. 6 describes at least one embodiment having the shared tunnel between the access network node and the user plane function network element established based on the tunnel establishment request. After the shared tunnel is established, the following describes how the terminal device sends and receives data based on the shared tunnel. FIG. 7A and FIG. 7B show an information processing method according to at least one embodiment. After the session management network element sends the second shared tunnel establishment information to the access network node in step 606, the information processing method provided in at least one embodiment further includes the following steps.

701: An access and mobility management network element receives a session establishment request from the terminal device.

After the shared tunnel is established between the access network node and the user plane function network element, to receive and send data by using the shared tunnel, the terminal device first triggers session establishment, and sends the session establishment request to the access and mobility management network element.

In at least one embodiment, the session establishment request includes the user group information of the terminal device and a slice identifier. The user group information of the terminal device is a data network name DNN of the terminal device, and the slice identifier is an identifier of a network slice used for data transmission.

702: The access and mobility management network element determines, based on the session establishment request, the session management network element corresponding to the terminal device.

The communication system includes a plurality of session management network elements, and the access and mobility management network element selects one session management network element from the plurality of session management network elements based on the session establishment request. For example, the session establishment request includes the DNN, and the access and mobility management network element determines, based on the DNN, a session management network element that matches the DNN.

In at least one embodiment, that the access and mobility management network element determines, based on the session establishment request, the session management network element corresponding to the terminal device in step 702 includes:

The access and mobility management network element determines group information of the terminal device based on the session establishment request;

the access and mobility management network element sends the group information of the terminal device to a session selection network element; and the access and mobility management network element receives session management network element information determined by the session selection network element.

After receiving the session establishment request, the access and mobility management network element obtains the group information of the terminal device based on the session establishment request. For example, the access and mobility management network element obtains the user group information (which is referred to as group information for short) of the terminal device from a user subscription data management entity (unified data management, UDM). For example, the group information includes information such as a group identifier, the slice identifier, and the DNN. The session selection network element is an entity having a network element selection function. The session management network element corresponding to the user group information of the terminal device is preconfigured for the session selection network element, and the session selection network element sends the corresponding session management network element information to the access and mobility management network element based on the group information of the terminal device. The session selection network element is a network slice selection function entity (network slice selection function, NSSF) and/or a network exposure function entity (network repository function, NRF).

703: The access and mobility management network element sends a session management context establishment request to the session management network element.

In at least one embodiment, after the access and mobility management network element determines the session management network element, the access and mobility management network element sends the session management context establishment request to the session management network element. The session management context establishment request is used to trigger establishment of a session management (session management, SM) context. The session management context establishment request carries the user group information of the terminal device.

In at least one embodiment, after the access and mobility management network element sends the session management context establishment request to the session management network element in step 703, the information processing method provided in at least one embodiment further includes the following steps:

The access and mobility management network element receives shared tunnel establishment information from the session management network element, where the shared tunnel establishment information includes the identifier of the shared tunnel and the address of the user plane function network element; and the access and mobility management network element sends the shared tunnel establishment information to the access network node.

In response to the shared tunnel being established for the terminal device, the session management network element further obtains the identifier of the shared tunnel and the address of the user plane function network element, and then send the shared tunnel establishment information to the access and mobility management network element, so that the access and mobility management network element sends the shared tunnel establishment information to the access network node. The access network node stores the shared tunnel establishment information for subsequent data transmission of the terminal device.

704: After receiving the session management context establishment request, the session management network element determines, based on the session management context establishment request, the shared tunnel established for the terminal device.

In at least one embodiment, after receiving the session management context establishment request, the session management network element determines, based on the session management context establishment request, whether the shared tunnel has been established for the terminal device in advance. In response to determining that the shared tunnel is established for the terminal device, subsequent step 705 is performed. In response to the shared tunnel not being established for the terminal device, the shared tunnel establishment procedure shown in FIG. 6 is performed again.

In at least one embodiment, the session management context establishment request includes the group information of the terminal device. For example, the session management context establishment request carries the user group information of the terminal device. The session management network element queries, based on the user group information, the tunnel configuration policy stored in the session management network element, to determine whether the shared tunnel has been established for the terminal device.

705: The session management network element sends session establishment information to the user plane function network element, where the session establishment information includes an identifier of the terminal device and the identifier of the shared tunnel.

In at least one embodiment, in response to the shared tunnel being established for the terminal device, the session management network element obtains the identifier of the terminal device and the identifier of the shared tunnel, and then sends the session establishment information to the user plane function network element, so that the user plane function network element obtains the identifier of the terminal device and the identifier of the shared tunnel. Therefore, the user plane function network element receives and sends data by using the shared tunnel.

706: The session management network element sends shared tunnel configuration information to the access and mobility management network element, where the shared tunnel configuration information includes the identifier of the shared tunnel and the address of the user plane function network element.

In at least one embodiment, in response to the shared tunnel being established for the terminal device, the session management network element further obtains the identifier of the shared tunnel and the address of the user plane function network element, and then send the shared tunnel establishment information to the access and mobility management network element, so that the access and mobility management network element sends the shared tunnel establishment information to the access network node. The access network node stores the shared tunnel establishment information for subsequent data transmission of the terminal device.

The example descriptions describe that, after the shared tunnel is established between the access network node and the user plane function network element, to receive and send data by using the shared tunnel, the terminal device first triggers session establishment, and sends the session establishment request to the access and mobility management network element. The access and mobility management network element interacts with the session management network element, to successfully establish a session context, so that the terminal device transmits data by using the shared tunnel.

To better understand and implement at least one embodiment, the following uses corresponding scenarios as examples.

Figure 8:
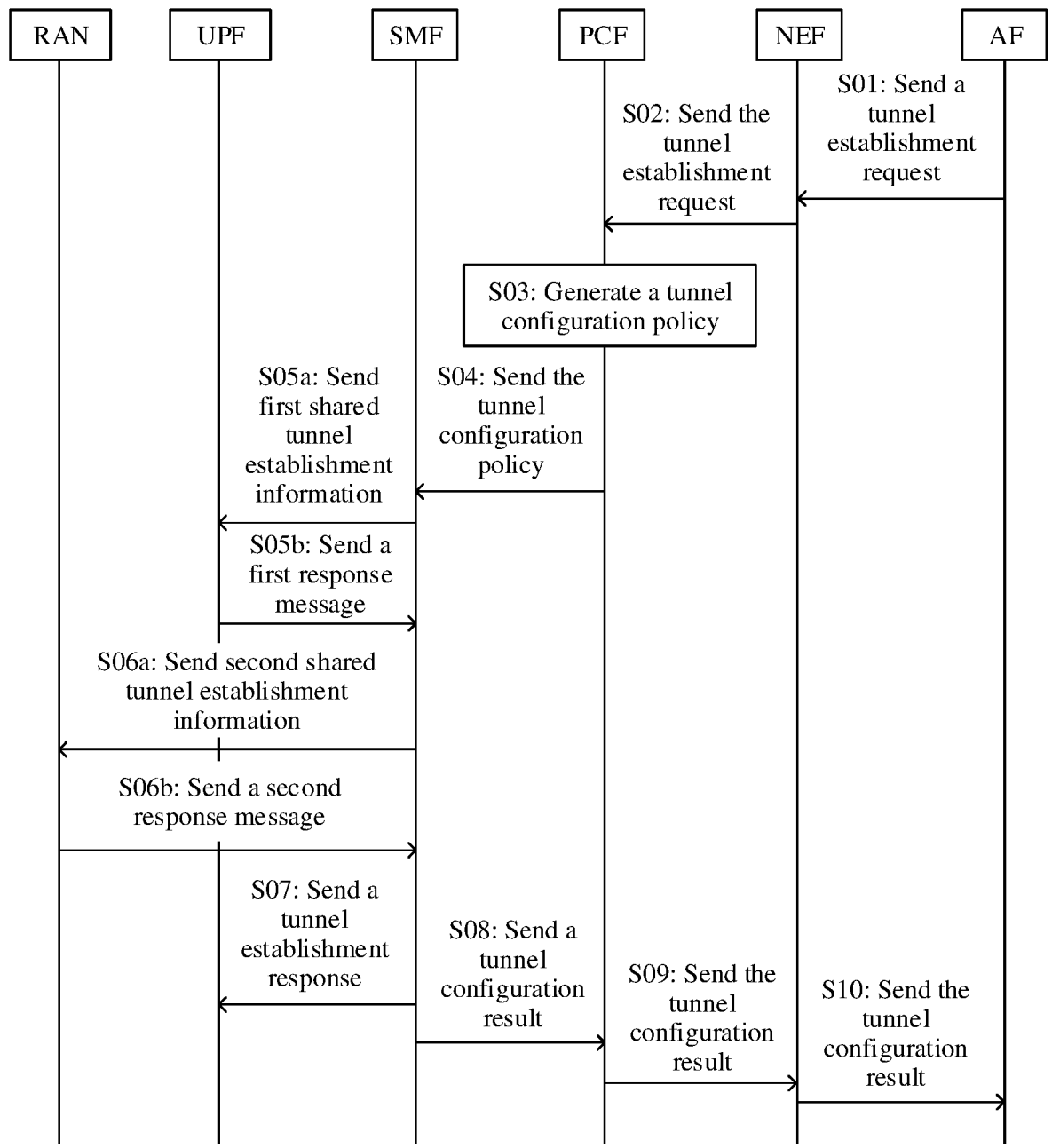
FIG. 8 is a schematic block diagram of an interaction procedure of establishing a shared tunnel in a 5G network according to at least one embodiment.

As shown in FIG. 8, at least one embodiment describes a schematic diagram of an interaction procedure between an AF, an NEF, a PCF, an SMF, a UPF, and a RAN. The PCF establishes a shared tunnel based on a tunnel establishment request from the AF. The following procedure is mainly included.

S01: The AF sends the tunnel establishment request to the NEF.

S02: The NEF sends the tunnel establishment request to the PCF.

Specifically, the AF provides the tunnel establishment request to the NEF, where the tunnel establishment request includes user group information, service information, QoS information (for example, a bandwidth and a delay), network area information, and the like. The user group information is used to identify a user group corresponding to the shared tunnel, and is specifically a user group identifier (group ID). The service information is used to describe a service corresponding to the shared tunnel, and is information such as an IP address and a port number of the service. The network area information is used to determine a range for establishing the shared tunnel, and is specific geographical area information. The QoS information is used to describe a QoS configuration that is of a service application and that is on the shared tunnel, and is, for example, a data transmission rate and an end-to-end delay that is provided by the shared tunnel.

The NEF selects the PCF based on the network area information or local configuration information, and forwards the tunnel establishment request obtained from the AF. In actual network deployment, a plurality of PCFs exist. Different PCFs serve different network areas, that is, the NEF selects the PCF based on the network area information. Alternatively, an operator deploys some specific PCFs in advance, to specifically process establishment of the shared tunnel. In this case, the NEF preconfigures and determines address information of the specific PCFs.

S03: The PCF generates a tunnel configuration policy.

Specifically, the PCF determines, based on the tunnel establishment request provided by the AF and a group policy of the operator, the shared tunnel configuration policy corresponding to the tunnel establishment request of the AF. The shared tunnel configuration policy includes: the user group information, an identifier of the shared tunnel, a QoS information, and the network area information. The user group information is a user group identifier, or the PCF maps the user group identifier to a corresponding data network name or network slice identifier based on a local configuration of the PCF.

S04: The PCF sends the tunnel configuration policy to the SMF.

The PCF selects the corresponding SMF based on the network area information, and sends the shared tunnel configuration policy to one or more corresponding SMFs, to trigger the SMF to establish the shared tunnel.

S05a: The SMF sends first shared tunnel establishment information to the UPF.

S05b: The UPF sends a first response message to the SMF.

Specifically, the SMF stores the shared tunnel configuration policy, selects the corresponding UPF based on the network area information and UPF capability information (for example, whether the shared tunnel is supported), and sends the first shared tunnel establishment information. The first shared tunnel establishment information includes the identifier of the shared tunnel and the QoS information. The UPF returns acknowledgment (ACK) information to the SMF and stores the shared tunnel establishment information for subsequent data transmission.

S06a: The SMF sends second shared tunnel establishment information to the RAN.

S06b: The RAN sends a second response message to the SMF.

The SMF determines the related RAN node based on the network area information, and sends the second shared tunnel establishment information to the RAN node. The second shared tunnel establishment information includes the identifier of the shared tunnel, the QoS information, and an address of the UPF. For example, the SMF first sends the second shared tunnel establishment information to the AMF, and the AMF forwards the second shared tunnel establishment information to the RAN. The RAN stores the second shared tunnel establishment information, and returns, to the SMF, an address of the RAN corresponding to the shared tunnel.

S07: The SMF sends a tunnel establishment response to the UPF.

The SMF sends, to the UPF, the address of the RAN corresponding to the shared tunnel.

S08: The SMF sends a tunnel configuration result to the PCF.

S09: The PCF sends the tunnel configuration result to the NEF.

S10: The NEF sends the tunnel configuration result to the AF.

After the shared tunnel is established, the SMF sends the tunnel configuration result to the PCF, and the PCF returns the tunnel configuration result to the AF by using the NEF, so that the AF obtains the tunnel configuration result.

In at least one embodiment, the AF provides the shared tunnel configuration information to a network, so that the shared tunnel is established. To be specific, during actual application, the AF updates configuration information of the shared tunnel to the network based on a service configuration. For example, the SMF determines whether to re-establish a new shared tunnel or modify a previously established shared tunnel. The PCF obtains the user group information, the service information, the QoS information, and the network area information of the terminal device, so that the PCF correspondingly updates the shared tunnel configuration policy and update establishment of the shared tunnel.

In at least one embodiment, the PCF dynamically creates and updates the shared tunnel based on the service configuration. For example, the service configuration includes the user group information, the service information, the QoS information, the network area information, and the like. Therefore, the shared tunnel is applicable to terminal devices of various service types.

Figure 9:
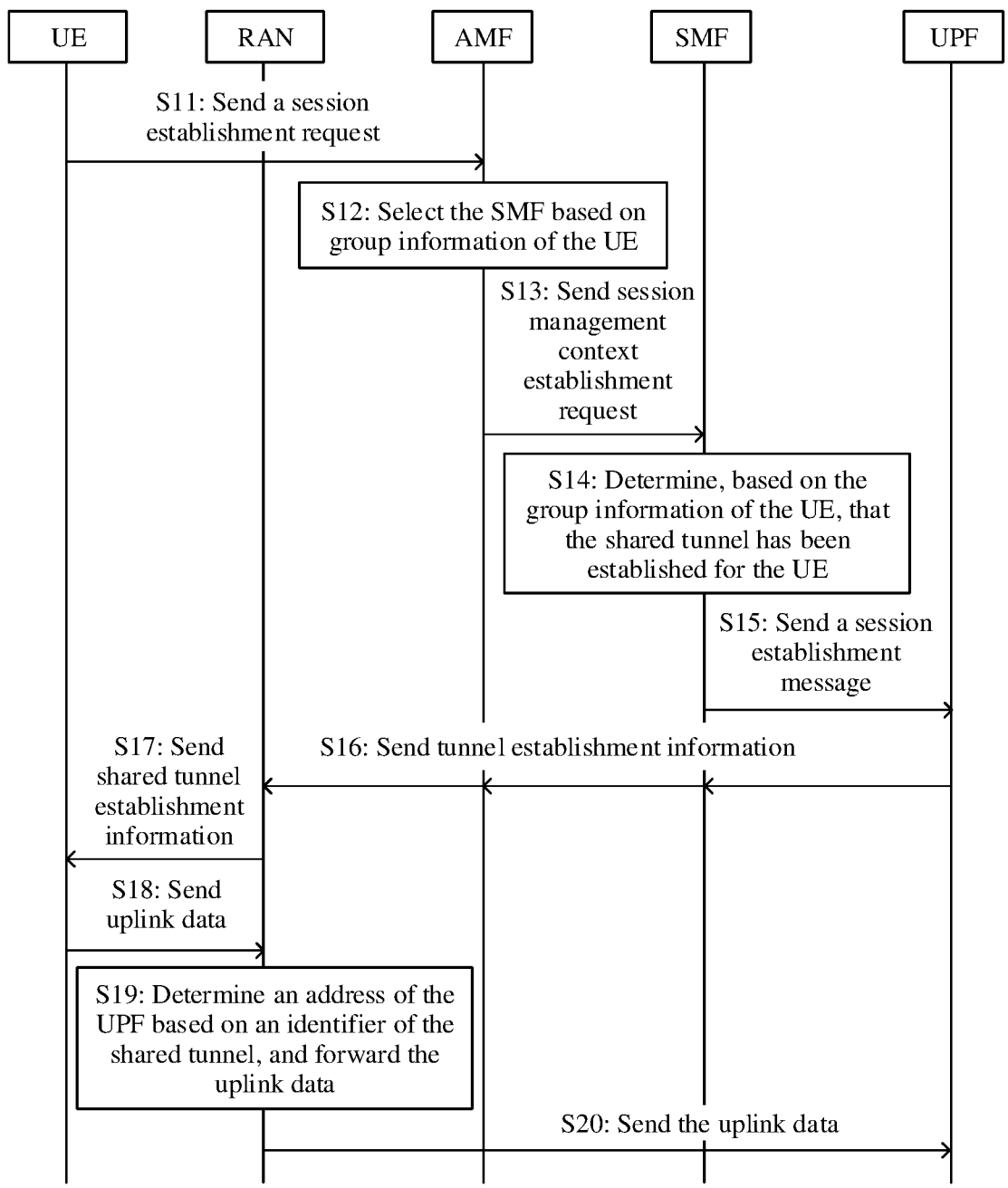
FIG. 9 is a schematic block diagram of another interaction procedure of establishing a shared tunnel in a 5G network according to at least one embodiment.

As shown in FIG. 9, after the shared tunnel establishment procedure shown in FIG. 8 is completed, UE sends and receive data based on the created shared tunnel. The following process is mainly included.

S11: The UE sends a session establishment request to an AMF.

The UE initiates a PDU session establishment request message to the AMF, where the request message carries requested DNN and slice identifier information.

S12: The AMF selects an SMF based on user group information of the UE.

The AMF obtains the user group information of the UE from a user subscription data management entity, for example, information such as a user group identifier corresponding to the UE and an identifier of a slice to which the UE subscribes. That the AMF selects a corresponding SMF based on user group information of the UE specifically includes: The AMF sends the user group information of the UE to a session selection network element, where the user group information includes information such as a group identifier, a slice identifier, and a DNN; and the SMF corresponding to the user group information of the UE is preconfigured for the session selection network element, and the session selection network element returns corresponding SMF information to the AMF based on the user group information that is provided by the AMF and that is of the UE. The session selection network element is an NSSF and/or an NRF.

S13: The AMF sends a session management context establishment request to the SMF.

Specifically, the AMF sends a PDU session SM context establishment request message to the selected SMF, where the PDU session SM context establishment request message carries the user group information of the UE.

S14: The SMF determines, based on the user group information of the UE, that the shared tunnel has been established for the UE.

Based on the user group information of the UE, the SMF queries the shared tunnel configuration policy stored in the SMF, for whether the shared tunnel has been established for the UE.

S15: The SMF sends session establishment information to a UPF.

The SMF sends the corresponding session establishment message to the corresponding UPF, where the session establishment message includes an identifier of the UE and an identifier of the corresponding shared tunnel. The UPF returns ACK information to the SMF, and the UPF and the SMF store shared tunnel establishment information for subsequent data transmission of the UE.

S16: The UPF sends tunnel establishment information to a RAN.

The SMF sends the tunnel establishment information to the RAN, where the tunnel establishment information includes the identifier of the shared tunnel and an address of the UPF.

S17: The RAN sends the shared tunnel establishment information to the UE.

The RAN sends the shared tunnel establishment information to the UE for subsequent data transmission of the UE.

S18: The UE sends uplink data to the RAN.

The UE sends the uplink data to the RAN, where the uplink data carries the identifier of the corresponding shared tunnel.

S19: The RAN determines the address of the UPF based on the identifier of the shared tunnel, and forwards the uplink data.

The RAN determines the address of the corresponding UPF based on the identifier of the shared tunnel, and correspondingly forwards the uplink data.

S20: The RAN sends the uplink data to the UPF.

The RAN forwards the uplink data to the corresponding UPF, where the uplink data carries the identifier of the shared tunnel.

A downlink data transmission process is similar to the uplink data transmission process, and details are not described herein again.

In at least one embodiment, the AMF selects the SMF based on the user group information of the UE, and the SMF determines, based on the user group information of the UE, whether the shared tunnel that is used for the UE has been pre-established, so that the UE is allocated to the corresponding shared tunnel for subsequent data transmission.

In at least one embodiment, the SMF is selected based on the user group information of the UE, and the SMF allocates the shared tunnel based on the group information of the UE. During actual application, the shared tunnel is flexibly configured, and an operator flexibly configures UE information based on which the shared tunnel is configured and allocated.

The foregoing method embodiments are represented as a combination of a series of actions. However, a person skilled in the art appreciates that at least one embodiment is not limited to the described order of the actions, because some steps are performed in another order or simultaneously. A person skilled in the art further knows that at least one embodiment described herein are examples.

To better implement at least one embodiment, a related apparatus is further provided below.

Figure 10:
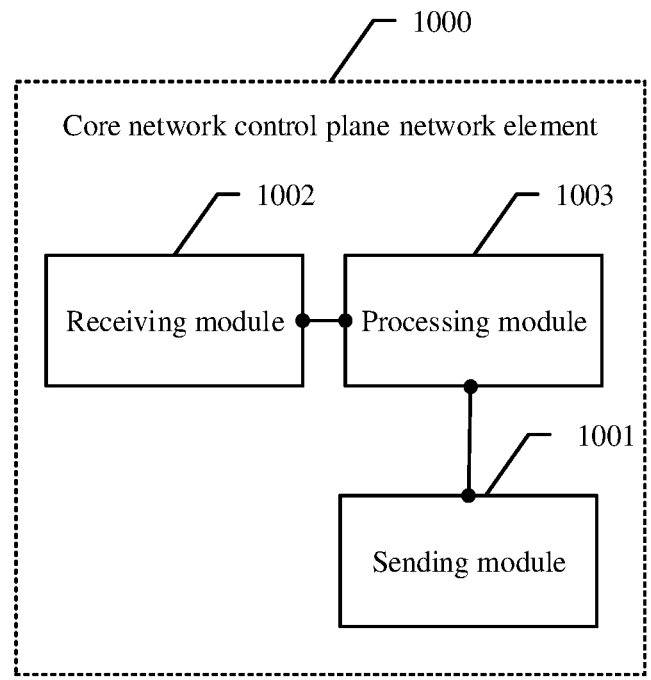
FIG. 10 is a schematic diagram of a composition structure of a core network control plane network element according to at least one embodiment.

Refer to FIG. 10. A core network control plane network element 1000 provided in at least one embodiment includes a sending module 1001, a receiving module 1002, and a processing module 1003.

The receiving module is configured to receive a tunnel establishment request from an application function entity, where the tunnel establishment request is used to request to establish a shared tunnel for transmitting data by a terminal device;

the processing module is configured to determine a tunnel configuration policy corresponding to the tunnel establishment request;

the processing module is configured to select a session management network element based on the tunnel establishment request; and the sending module is configured to send the tunnel configuration policy to the session management network element, where the tunnel configuration policy is used to indicate the session management network element to trigger establishment of the shared tunnel between an access network node and a user plane function network element.

In at least one embodiment, the receiving module is configured to receive the tunnel establishment request from a network exposure network element, where the network exposure network element receives the tunnel establishment request from the application function entity.

In at least one embodiment, the processing module is configured to obtain a group configuration policy corresponding to the terminal device; and generate the tunnel configuration policy based on the tunnel establishment request and the group configuration policy.

In at least one embodiment, the tunnel establishment request includes at least one of the following: first group information corresponding to the terminal device, service information corresponding to the shared tunnel, quality of service information corresponding to the shared tunnel, and network area information corresponding to the shared tunnel.

In at least one embodiment, the tunnel configuration policy includes at least one of the following: second group information corresponding to the terminal device, an identifier of the shared tunnel, the quality of service information corresponding to the shared tunnel, and the network area information corresponding to the shared tunnel.

Figure 11:
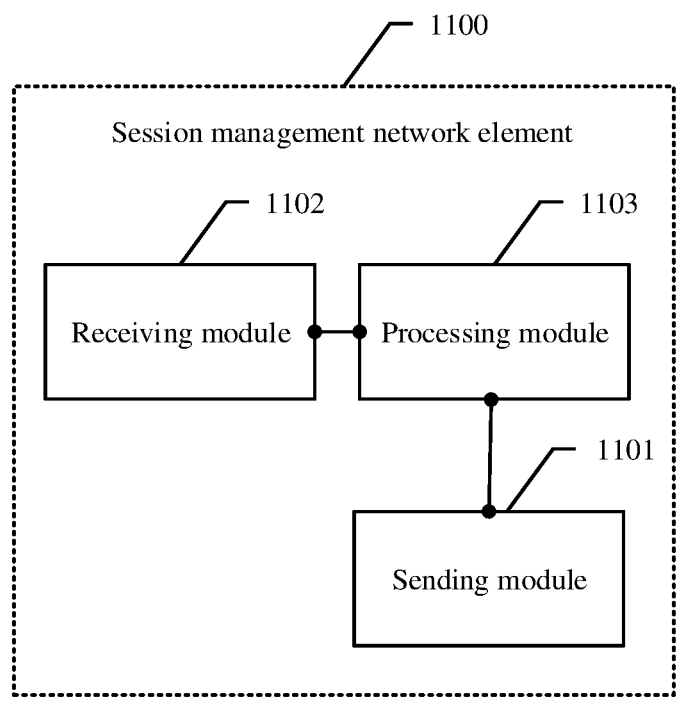
FIG. 11 is a schematic diagram of a composition structure of a session management network element according to at least one embodiment.

Refer to FIG. 11. A session management network element 1100 provided in in at least one embodiment includes a sending module 1101, a receiving module 1102, and a processing module 1103.

The receiving module is configured to receive a tunnel configuration policy from a core network control plane network element;

the processing module is configured to select a user plane function network element based on the tunnel configuration policy and user plane function network element capability information;

the sending module is configured to send first shared tunnel establishment information to the user plane function network element;

the processing module is configured to determine an access network node according to the tunnel configuration policy; and the sending module is configured to send second shared tunnel establishment information to the access network node, where the first shared tunnel establishment information and the second shared tunnel establishment information are used to establish a shared tunnel between the access network node and the user plane function network element.

In at least one embodiment, the first shared tunnel establishment information includes at least one of the following: an identifier of the shared tunnel and quality of service information corresponding to the shared tunnel.

In at least one embodiment, the second shared tunnel establishment information includes at least one of the following: the identifier of the shared tunnel, the quality of service information corresponding to the shared tunnel, and an address of the user plane function network element.

In at least one embodiment, the receiving module is configured to: after the sending module sends the second shared tunnel establishment information to the access network node, receive a tunnel establishment response from the access network node, where the tunnel establishment response includes an address of the access network node corresponding to the shared tunnel.

In at least one embodiment, the sending module is configured to: after the receiving module receives the tunnel establishment response from the access network node, send session configuration information to the user plane function network element, where the session configuration information includes at least one of the following: the identifier of the shared tunnel and the address of the access network node corresponding to the shared tunnel.

In at least one embodiment, the receiving module is configured to: after the sending module sends the second shared tunnel establishment information to the access network node, receive a session management context establishment request from an access and mobility management network element;

the processing module is configured to determine, based on the session management context establishment request, the shared tunnel established for a terminal device;

the sending module is configured to send session establishment information to the user plane function network element, where the session establishment information includes an identifier of the terminal device and the identifier of the shared tunnel; and the sending module is configured to send shared tunnel configuration information to the access and mobility management network element, where the shared tunnel configuration information includes the identifier of the shared tunnel and the address of the user plane function network element.

Figure 12:
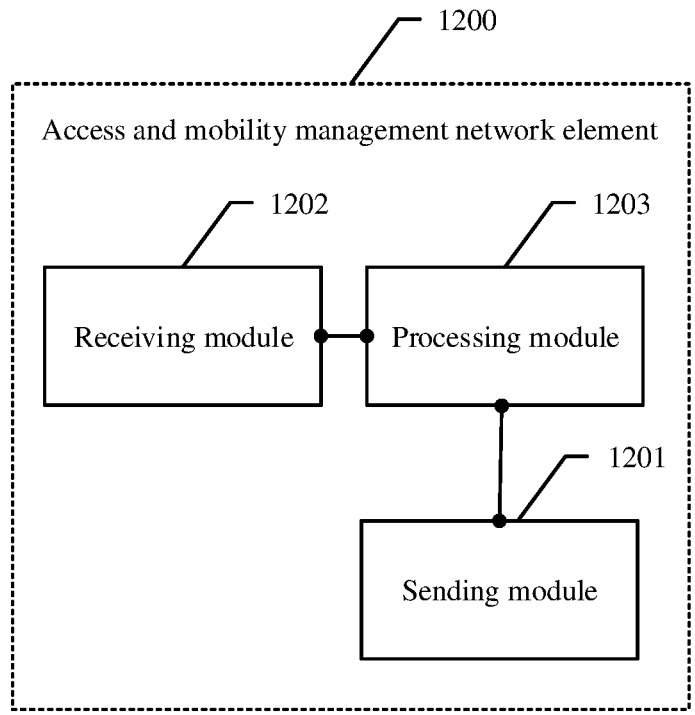
FIG. 12 is a schematic diagram of a composition structure of an access and mobility management network element according to at least one embodiment.

Refer to FIG. 12. An access and mobility management network element 1200 provided in at least one embodiment includes a sending module 1201, a receiving module 1202, and a processing module 1203.

The receiving module is configured to receive a session establishment request from a terminal device;

the processing module is configured to determine, based on the session establishment request, a session management network element corresponding to the terminal device; and the sending module is configured to send a session management context establishment request to the session management network element.

In at least one embodiment, the processing module is configured to determine group information of the terminal device based on the session establishment request;

the sending module is configured to send the group information of the terminal device to a session selection network element; and the receiving module is configured to receive session management network element information determined by the session selection network element.

In at least one embodiment, the receiving module is configured to: after the sending module sends the session management context establishment request to the session management network element, receive shared tunnel establishment information from the session management network element, where the shared tunnel establishment information includes an identifier of a shared tunnel and an address of a user plane function network element; and the sending module is configured to send the shared tunnel establishment information to an access network node.

It is learned from the example descriptions of the foregoing embodiment that the application function entity determines the terminal device that transmits data by using the shared tunnel, and the application function entity sends the tunnel establishment request to the core network control plane network element. The core network control plane network element sends the tunnel configuration policy to the session management network element, so that the session management network element determines the user plane function network element and the access network node. The user plane function network element and the access network node is the shared tunnel used by the terminal device to transmit data. In at least one embodiment, the shared tunnel requested by the application function entity to be established is used for transmitting data by the terminal device, so that the shared tunnel is dynamically established between the access network node and the user plane function network element based on a service configuration of the terminal device on the data transmission, and the shared tunnel that is dynamically established implements the data transmission of the terminal device.

Content such as information exchange between the modules/units of the apparatus and the execution processes thereof is based on a same concept as the method embodiments, and achieves same technical effects as the method embodiments. For specific content, refer to the foregoing descriptions in the method embodiments of this application. Details are not described herein again.

At least ne embodiment provides a computer storage medium. The computer storage medium stores a program. The program is executed to perform steps recorded in the method embodiments.

Figure 13:
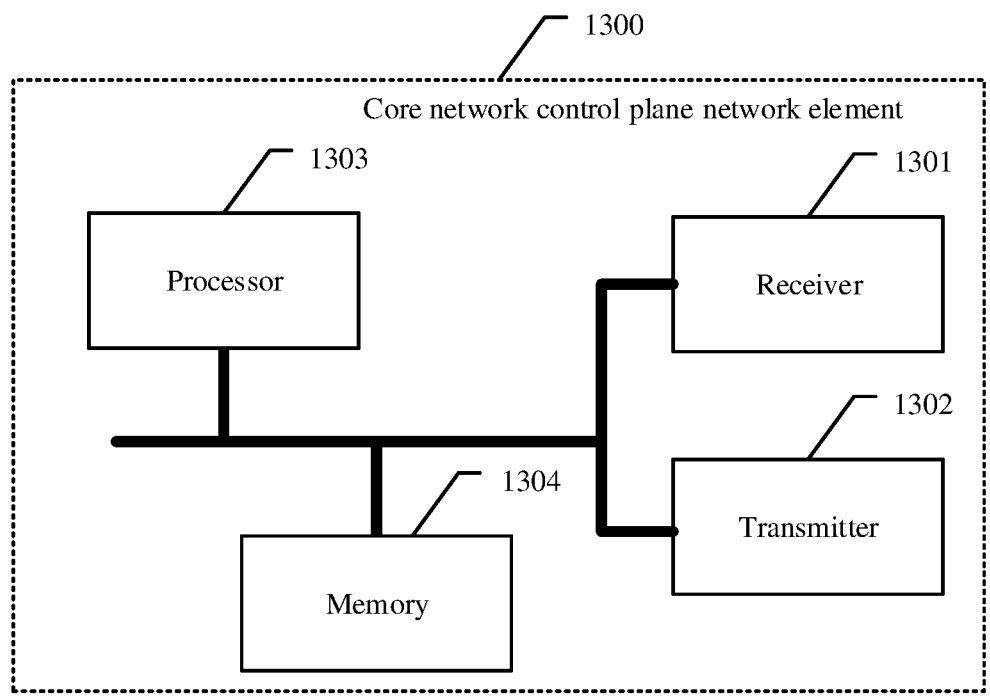
FIG. 13 is a schematic diagram of a composition structure of another core network control plane network element according to at least one embodiment.

The following describes another core network control plane network element provided in at least one embodiment. Refer to FIG. 13. A core network control plane network element 1300 includes:

a receiver 1301, a transmitter 1302, a processor 1303, and a memory 1304 (there is one or more processors 1303 in the core network control plane network element 1300, and one processor is used as an example in FIG. 13). In at least one embodiment, the receiver 1301, the transmitter 1302, the processor 1303, and the memory 1304 is connected through a bus or in another manner. In FIG. 13, connection through a bus is used as an example.

The memory 1304 includes a read-only memory and a random access memory, and provide instructions and data for the processor 1303. A part of the memory 1304 further includes a non-volatile random access memory (non-volatile random access memory, NVRAM). The memory 1304 stores an operating system and operation instructions, an executable module or a data structure, or a subset thereof, or an extended set thereof. The operation instructions includes various operation instructions that are used to implement various operations. The operating system includes various system programs, to implement various basic services and process a hardware-based task.

The processor 1303 controls an operation of the core network control plane network element, and the processor 1303 is also referred to as a central processing unit (central processing unit, CPU). During specific application, components of the core network control plane network element are coupled together through a bus system. In addition to a data bus, the bus system further includes a power bus, a control bus, a status signal bus, or the like. However, for clear description, various types of buses in the figure are referred to as the bus system.

The method disclosed in the foregoing embodiments is applied to the processor 1303, or is implemented by the processor 1303. The processor 1303 is an integrated circuit chip, and has a signal processing capability. In an implementation process, steps in the foregoing methods are implemented by using a hardware integrated logical circuit in the processor 1303, or by using instructions in a form of software. The processor 1303 is a general-purpose processor, a digital signal processor (digital signal processor, DSP), an application-specific integrated circuit (application-specific integrated circuit, ASIC), a field programmable gate array (field programmable gate array, FPGA) or another programmable logic component, a discrete gate or transistor logic device, or a discrete hardware component. The processor implements or performs the methods, the steps, and the logical block diagrams that are disclosed in at least one embodiment. The general-purpose processor is a microprocessor, or the processor is a central processing unit, microcontroller, digital signal processor, or the like. Steps of the methods disclosed with reference to at least one embodiment are directly executed and accomplished by using a hardware decoding processor, or are executed and accomplished by using a combination of hardware and software modules in the decoding processor. The software module is located in a mature storage medium in the art, such as a random access memory, a flash memory, a read-only memory, a programmable read-only memory, an electrically erasable programmable memory, or a register. The storage medium is located in the memory 1304, and the processor 1303 reads information in the memory 1304 and completes the steps in the foregoing methods in combination with hardware in the processor 1303.

The receiver 1301 is configured to receive input digit or character information, and generate signal input related to a related setting and function control of the core network control plane network element. The transmitter 1302 includes a display device such as a display screen, and the transmitter 1302 is configured to output digit or character information through an external interface.

In at least one embodiment, the processor 1303 is configured to perform the information processing method performed by the core network control plane network element.

Figure 14:
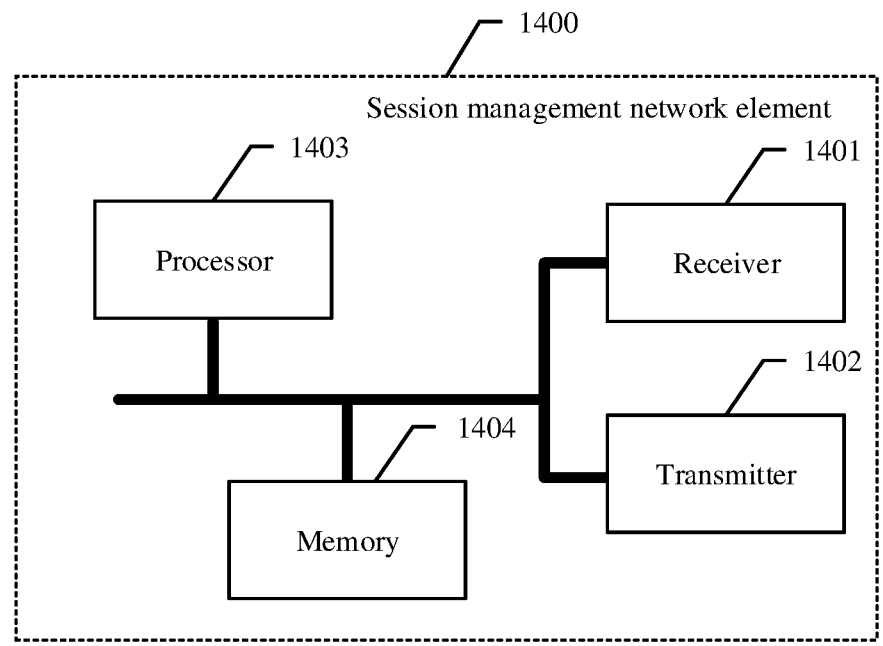
FIG. 14 is a schematic diagram of a composition structure of another session management network element according to at least one embodiment.

The following describes another session management network element provided in at least one embodiment. Refer to FIG. 14. A session management network element 1400 includes:

a receiver 1401, a transmitter 1402, a processor 1403, and a memory 1404 (there is one or more processors 1403 in the session management network element 1400, and one processor is used as an example in FIG. 14). In at least one embodiment, the receiver 1401, the transmitter 1402, the processor 1403, and the memory 1404 is connected through a bus or in another manner.

In FIG. 14, connection through a bus is used as an example.

The memory 1404 includes a read-only memory and a random access memory, and provide instructions and data for the processor 1403. A part of the memory 1404 further includes an NVRAM. The memory 1404 stores an operating system and operation instructions, an executable module or a data structure, or a subset thereof, or an extended set thereof. The operation instructions includes various operation instructions that are used to implement various operations. The operating system includes various system programs, to implement various basic services and process a hardware-based task.

The processor 1403 controls an operation of the session management network element, and the processor 1403 is also referred to as a CPU. Components of the session management network element are coupled together through a bus system. In addition to a data bus, the bus system further includes a power bus, a control bus, a status signal bus, or the like. However, for clear description, various types of buses in the figure are referred to as the bus system.

The method disclosed in the foregoing embodiments are applied to the processor 1403, or are implemented by the processor 1403. The processor 1403 is an integrated circuit chip, and has a signal processing capability. In at least one embodiment, steps in the foregoing methods are implemented by using a hardware integrated logical circuit in the processor 1403, or by using instructions in a form of software. The foregoing processor 1403 is a general-purpose processor, a DSP, an ASIC, an FPGA or another programmable logic component, a discrete gate or transistor logic device, or a discrete hardware component. The processor implements or performs the methods, the steps, and the logical block diagrams that are disclosed in at least one embodiment. The general-purpose processor is a microprocessor, or the processor is, a central processing unit, microcontroller, digital signal processor, or the like. Steps of the methods disclosed with reference to at least one embodiment are directly executed and accomplished by using a hardware decoding processor, or are executed and accomplished by using a combination of hardware and software modules in the decoding processor. The software module is located in a mature storage medium in the art, such as a random access memory, a flash memory, a read-only memory, a programmable read-only memory, an electrically erasable programmable memory, or a register. The storage medium is located in the memory 1404, and the processor 1403 reads information in the memory 1404 and completes the steps in the foregoing methods in combination with hardware in the processor 1403.

In at least one embodiment, the processor 1403 is configured to perform the information processing method performed by the session management network element.

Figure 15:
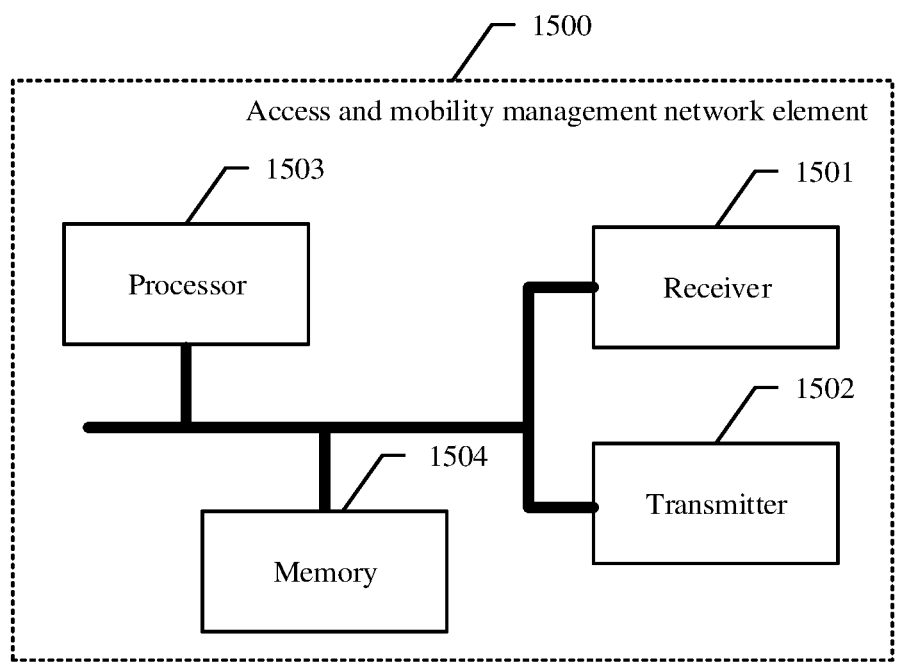
FIG. 15 is a schematic diagram of a composition structure of another access and mobility management network element according to at least one embodiment.

The following describes another access and mobility management network element provided in at least one embodiment. Refer to FIG. 15. An access and mobility management network element 1500 includes:

a receiver 1501, a transmitter 1502, a processor 1503, and a memory 1504 (there is one or more processors 1503 in the access and mobility management network element 1500, and one processor is used as an example in FIG. 15). In at least one embodiment, the receiver 1501, the transmitter 1502, the processor 1503, and the memory 1504 is connected through a bus or in another manner. In FIG. 15, connection through a bus is used as an example.

The memory 1504 includes a read-only memory and a random access memory, and provide instructions and data for the processor 1503. A part of the memory 1504 further includes an NVRAM. The memory 1504 stores an operating system and operation instructions, an executable module or a data structure, or a subset thereof, or an extended set thereof. The operation instructions includes various operation instructions that are used to implement various operations. The operating system includes various system programs, to implement various basic services and process a hardware-based task.

The processor 1503 controls an operation of the access and mobility management network element, and the processor 1503 is also referred to as a CPU. During specific application, components of the access and mobility management network element are coupled together through a bus system. In addition to a data bus, the bus system further includes a power bus, a control bus, a status signal bus, or the like. However, for clear description, various types of buses in the figure are referred to as the bus system.

The method disclosed in the foregoing embodiments are applied to the processor 1503, or are implemented by the processor 1503. The processor 1503 is an integrated circuit chip, and has a signal processing capability. In an implementation process, steps in the foregoing methods are implemented by using a hardware integrated logical circuit in the processor 1503, or by using instructions in a form of software. The foregoing processor 1503 is a general-purpose processor, a DSP, an ASIC, an FPGA or another programmable logic component, a discrete gate or transistor logic device, or a discrete hardware component. The processor implements or performs the methods, the steps, and the logical block diagrams that are disclosed in at least one embodiment. The general-purpose processor is a microprocessor, or the processor is a central processing unit, microcontroller, digital signal processor, or the like. Steps of the methods disclosed with reference to at least one embodiment are directly executed and accomplished by using a hardware decoding processor, or are executed and accomplished by using a combination of hardware and software modules in the decoding processor. The software module is located in a mature storage medium in the art, such as a random access memory, a flash memory, a read-only memory, a programmable read-only memory, an electrically erasable programmable memory, or a register. The storage medium is located in the memory 1504, and the processor 1503 reads information in the memory 1504 and completes the steps in the foregoing methods in combination with hardware in the processor 1503.

In at least one embodiment, the processor 1503 is configured to perform the request processing method performed by the access and mobility management network element.

In at least one embodiment of the core network control plane network element, the session management network element, and the access and mobility management network element being a chip, the chip includes a processing unit and the communication unit. The processing unit is, for example, a processor, and the communication unit is, for example, an input/output interface, a pin, or a circuit. The processing unit executes computer-executable instructions stored in a storage unit, to enable the chip in the terminal device to perform the information processing method according to at least one embodiment. In at least one embodiment, the storage unit is a storage unit in the chip, for example, a register or a cache. Alternatively, the storage unit is a storage unit that is in the terminal and that is located outside the chip, for example, a read-only memory (read-only memory, ROM), another type of static storage device that stores static information and instructions, or a random access memory (random access memory, RAM).

The processor mentioned anywhere above is a general-purpose central processing unit, a microprocessor, an ASIC, or one or more integrated circuits configured to control program execution of the method.

In addition, embodiments described herein are merely examples. The units described as separate parts may or may not be physically separate, and parts displayed as units may or may not be physical units, is located in one position, or is distributed on a plurality of network units. At least one of the modules are selected according to actual needs to achieve the objectives of the solutions of embodiments. In addition, in the accompanying drawings of the apparatus provided in at least one embodiment, connection relationships between modules indicate that the modules have communication connections, which is implemented as one or more communications buses or signal cables.

Based on the description herein, a person skilled in the art clearly understands that at least one embodiment uses software in addition to hardware, or dedicated hardware, including a dedicated integrated circuit, a dedicated CPU, a dedicated memory, a dedicated component, and the like. Generally, any functions that performed by a computer program are easily implemented using corresponding hardware. Moreover, a hardware structure used to achieve a same function is of various forms, for example, in a form of an analog circuit, a digital circuit, or a dedicated circuit. However, in at least one embodiment, a software program is used. Based on such an understanding, the technical solutions of at least one embodiment are implemented as a software product. The computer software product is stored in a readable storage medium, such as a floppy disk, a USB flash drive, a removable hard disk, a ROM, a RAM, a magnetic disk, or an optical disc of a computer, and includes several instructions for instructing a computer device (which is a personal computer, a server, a network device, or the like) to perform the methods described in at least one embodiment.

At least one embodiment is implemented using software, hardware, firmware, or any combination thereof. In response to software being used, at least one embodiment is in a form of a computer program product.

The computer program product includes one or more computer instructions. In response to the computer program instructions being loaded and executed on the computer, the procedure or functions according to at least one embodiment are generated. The computer is a general-purpose computer, a dedicated computer, a computer network, or other programmable apparatuses. The computer instructions is stored in a computer-readable storage medium or is transmitted from a computer-readable storage medium to another computer-readable storage medium. For example, the computer instructions is transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium is any usable medium accessible by the computer, or a data storage device, such as a server or a data center, integrating one or more usable media. The usable medium is a magnetic medium (for example, a floppy disk, a hard disk, or a magnetic tape), an optical medium (for example, a DVD), a semiconductor medium (for example, a solid-state drive (Solid-State Drive, SSD)), or the like.

What is claimed is:

1. An information processing method, comprising:
   receiving, by a core network control plane network element, a tunnel establishment request from an application function entity, wherein the tunnel establishment request is used to establish a shared tunnel for transmitting data by a terminal device;
   determining, by the core network control plane network element, a tunnel configuration policy corresponding to the tunnel establishment request and a group configuration policy;

selecting, by the core network control plane network element, a session management network element from a plurality of session management network elements based on the tunnel establishment request and the group configuration policy; and sending, by the core network control plane network element, the tunnel configuration policy to the session management network element selected by the core network control plane network element, wherein the tunnel configuration policy is used to indicate the session management network element selected by the core network control plane network element to trigger establishment of the shared tunnel between an access network node and a user plane function network element.

2. The method according to claim 1, wherein the receiving, by a the core network control plane network element, the tunnel establishment request from an the application function entity includes:

receiving, by the core network control plane network element, the tunnel establishment request from a network exposure network element, wherein the network exposure network element receives the tunnel establishment request from the application function entity.

3. The method according to claim 1, wherein the determining, by the core network control plane network element, the tunnel configuration policy corresponding to the tunnel establishment request and the group configuration policy includes:

obtaining, by the core network control plane network element, the group configuration policy corresponding to the terminal device; and generating, by the core network control plane network element, the tunnel configuration policy based on the tunnel establishment request and the group configuration policy.

4. The method according to claim 1, wherein the tunnel establishment request includes at least one of the following: first group information corresponding to the terminal device, service information corresponding to the shared tunnel, quality of service information corresponding to the shared tunnel, or network area information corresponding to the shared tunnel.

5. The method according to claim 1, wherein the tunnel configuration policy includes at least one of the following: second group information corresponding to the terminal device, an identifier of the shared tunnel, quality of service information corresponding to the shared tunnel, and network area information corresponding to the shared tunnel.

6. An information processing method, comprising:

receiving, by a session management network element, a tunnel configuration policy from a core network control plane network element;

selecting, by the session management network element, a user plane function network element based on the tunnel configuration policy and user plane function network element capability information, and sending, by the session management network element, first shared tunnel establishment information to the user plane function network element selected by the session management network element based on the tunnel configuration policy and the user plane function network element capability information; and determining, by the session management network element, an access network node according to the tunnel configuration policy, and sending, by the session management network element, second shared tunnel establishment information to the access network node, wherein the first shared tunnel establishment information and the second shared tunnel establishment information are used to establish a shared tunnel between the access network node and the user plane function network element.

7. The method according to claim 6, wherein the first shared tunnel establishment information includes at least one of the following: an identifier of the shared tunnel and quality of service information corresponding to the shared tunnel.

8. The method according to claim 6, wherein the second shared tunnel establishment information includes at least one of the following: an identifier of the shared tunnel, quality of service information corresponding to the shared tunnel, and an address of the user plane function network element.

9. The method according to claim 6, wherein after the sending, by the session management network element, the second shared tunnel establishment information to the access network node, the method further includes:

receiving, by the session management network element, a tunnel establishment response from the access network node, wherein the tunnel establishment response includes an address of the access network node corresponding to the shared tunnel.

10. The method according to claim 9, wherein after the receiving, by the session management network element, the tunnel establishment response from the access network node, the method further includes:

sending, by the session management network element, session configuration information to the user plane function network element, wherein the session configuration information includes at least one of the following: an identifier of the shared tunnel and the address of the access network node corresponding to the shared tunnel.

11. The method according to of claim 6, wherein after the sending, by the session management network element, the second shared tunnel establishment information to the access network node, the method further includes:

receiving, by the session management network element, a session management context establishment request from an access and mobility management network element;

determining, by the session management network element based on the session management context establishment request, the shared tunnel established for a terminal device;

sending, by the session management network element, session establishment information to the user plane function network element, wherein the session establishment information includes an identifier of the terminal device and the identifier of the shared tunnel; and sending, by the session management network element, shared tunnel configuration information to the access and mobility management network element, wherein the shared tunnel configuration information includes the identifier of the shared tunnel and an address of the user plane function network element.

12. An information processing method, comprising:

receiving, by an access and mobility management network element, a session establishment request from a terminal device;

determining, by the access and mobility management network element based on the session establishment request and a group configuration policy, a session management network element, from a plurality of session management network elements, corresponding to the terminal device; and sending, by the access and mobility management network element, a session management context establishment request to the determined session management network element.

13. The method according to claim 12, wherein the determining, by the access and mobility management network element based on the session establishment request and a group configuration policy, the session management network element corresponding to the terminal device includes:

determining, by the access and mobility management network element, group information of the terminal device based on the session establishment request;

sending, by the access and mobility management network element, the group information of the terminal device to a session selection network element; and receiving, by the access and mobility management network element, session management network element information determined by the session selection network element.

14. The method according to claim 12, wherein after the sending, by the access and mobility management network element, the session management context establishment request to the session management network element, the method further includes:

receiving, by the access and mobility management network element, shared tunnel establishment information from the session management network element, wherein the shared tunnel establishment information includes an identifier of the shared tunnel and an address of a user plane function network element; and sending, by the access and mobility management network element, the shared tunnel establishment information to an access network node.

15. A communication apparatus, comprising:

at least one processor; and a non-transitory computer-readable storage medium coupled to the at least one processor and storing one or more instructions, in response to being executed by the at least one processor, cause the processor to perform operations including:

receiving a tunnel establishment request from an application function entity, wherein the tunnel establishment request is used to request establishment of a shared tunnel for transmitting data by a terminal device;

determining a tunnel configuration policy corresponding to the tunnel establishment request and a group configuration policy;

selecting a session management network element from a plurality of session management network elements based on the tunnel establishment request and the group configuration policy; and sending the tunnel configuration policy to the session management network element, wherein the tunnel configuration policy triggers the session management network element selected from the plurality of session management network elements to establish the shared tunnel between an access network node and a user plane function network element.

* * * * *